United States Patent [19]
White

[11] Patent Number: 6,066,583
[45] Date of Patent: May 23, 2000

[54] PROCESS FOR THE PRODUCTION OF CERAMIC MATERIALS

[75] Inventor: Geoffrey Vaughan White, Eastbourne, New Zealand

[73] Assignee: Industrial Research Limited, Lower Hutt, New Zealand

[21] Appl. No.: 09/066,369

[22] PCT Filed: Nov. 1, 1996

[86] PCT No.: PCT/NZ96/00122

§ 371 Date: May 27, 1998

§ 102(e) Date: May 27, 1998

[87] PCT Pub. No.: WO97/16388

PCT Pub. Date: May 7, 1997

[30] Foreign Application Priority Data

Nov. 1, 1995 [NZ] New Zealand ............................ 280376

[51] Int. Cl.[7] .................................................. C04B 35/599
[52] U.S. Cl. ....................... 501/98.1; 501/98.2; 501/98.3
[58] Field of Search ................................... 501/98.1, 98.2, 501/98.3

[56] References Cited

U.S. PATENT DOCUMENTS

| | | | |
|---|---|---|---|
| 4,243,621 | 1/1981 | Mori et al. | 501/98.1 |
| 4,360,506 | 11/1982 | Paris et al. | 501/98.1 |
| 4,499,193 | 2/1985 | Phelps et al. | 501/98.1 |
| 4,511,666 | 4/1985 | Phelps | 501/98.1 |
| 4,871,698 | 10/1989 | Fishler et al. | 501/98.1 |
| 5,108,967 | 4/1992 | Phelps et al. | 501/98.1 |
| 5,110,773 | 5/1992 | Corral et al. | 501/98.1 |
| 5,552,353 | 9/1996 | Kwong | 501/98.1 |
| 5,814,573 | 9/1998 | Hogg | 501/98.1 |
| 5,834,389 | 11/1998 | Barris et al. | 501/98.1 |
| 5,851,943 | 12/1998 | Barris et al. | 501/98.1 |
| 5,925,585 | 7/1999 | Schoennahl et al. | 501/98.1 |

FOREIGN PATENT DOCUMENTS 2 075 966  11/1981  United Kingdom .

OTHER PUBLICATIONS

Choi et al, "Synthesis of β'–Sialon with Various Compositions from Kaolin", *Journal of the Korean Ceramic Society*, vol. 23, No. 5, pp. 17–24 (1986). (With English translation (pp) 1–8). No month.

*Primary Examiner*—Karl Group
*Attorney, Agent, or Firm*—Breiner & Breiner

[57] ABSTRACT

A process for the production of α' or β'SiAlON from a starting mixture of silicon metal and clay, wherein the process includes heating the mixture in a flowing nitrogen, or nitrogen containing, atmosphere to a temperature sufficient to react the silicon and the nitrogen with the clay to form the β' or α'SiAlON and wherein the clay participates in the reaction as a source of aluminium and silicon.

35 Claims, 12 Drawing Sheets

PROCESS FOR THE PRODUCTION OF CERAMIC MATERIALS

TECHNICAL FIELD

The invention relates to a process for the production of SiAlON's and in particular to the production of β'SiAlON, α'SiAlON, and composites with these.

BACKGROUND ART

The term SiAlON, or silicon aluminium oxynitride, encompasses a family of compounds or phases comprised of the elements: silicon, aluminium, oxygen and nitrogen. Each phase is described by a composition range for which that particular structure is stable. β'-phase SiAlON (β'SiAlON) is stable over the composition range: $Si_{6-z}Al_zO_zN_{8-z}$ where z=0 to 4.2. This includes silicon nitride ($\beta Si_3N_4$) as the z=0 end member. β'SiAlON has the same structure as silicon nitride ($\beta Si_3N_4$), and can be regarded as a solid solution formed by substituting equal amounts of aluminium and oxygen for silicon and nitrogen respectively into the silicon nitride structure. The amounts of aluminium and oxygen which can be substituted into this structure increase with temperature. At 1750° C., z can range from 0 to 4.2. In general terms β'SiAlON compositions can be referred as low z compositions and high z compositions with low z being <3 and high z being ≧3. The z value basically refers to the aluminium content of the composition.

α'-phase SiAlON (α'SiAlON) has a structure derived from $\alpha Si_3N_4$ which is stabilised by metal cation (M) such as Y, Li, Ca. The general formula is

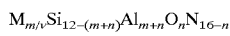

$$M_{m/v}Si_{12-(m+n)}Al_{m+n}O_nN_{16-n}$$

where m and n indicate the replacement of (m+N) (Si—N) bonds by m(Al—N) and n(Al—O) bonds and v represents the valency of the metal cation M. The limits of the αSiAlON composition are restricted and vary with the size and nature of the stabilising cation. For example, the limits of solubility of yttrium have been found to vary m/v from 0.33 to 0.67 for one composition range. A limited range of metal cations stabilise the αSiAlON structure. These are Li, Ca, Mg, Y and a number of the rare earth metals but not La or Ce. SiAlONs are advanced ceramic materials which exhibit useful properties such as high strength and hardness, low density, wear resistance and corrosion resistance, and are able to retain these properties at high temperatures. α'SiAlON, when fully dense, is a very hard material but brittle. β'SiAlON is less hard but tough. A composite of the two is a good compromise and yields excellent mechanical strength and wear resistance. SiAlONs are used in refractories and for a variety of engineering applications such as cutting tools, spray nozzles and pump seals. The exact properties of a given SiAlON depend on the chemical composition and fabrication variables, such as purity, grain size and shape, and the method of fabrication. β'SiAlON has similar properties to silicon nitride which include excellent resistance to attack by molten metal. Silicon nitride is commonly used as a refractory material.

Documents indicating the state of the art include:

U.S. Pat. No. 3,960,581 to Ivan B Cutler discloses a process for making SiAlONs from readily available raw materials, such as clay, together with carbon. There is no teaching or recognition however of the use of silicon metal in the process. Use of silicon metal allows synthesis of low z SiAlON compositions. In addition, the use of carbon is preferable, but not essential, in the process of the present invention. It is also low z β'SiAlON compositions that allow the formation of α'SiAlON compositions by the process of the present invention as will be further described herein.

DD 263749 to Akad Wissenschaft DDR, inventor Schikore H, which describes the production of SiAlON-based materials from a charge containing by weight (A) 75–95% clay, 5–25% carbon, and 0–50% aluminium compounds; or (B) 50–80% clay, 20–50% silicon carbide, and 0–50% aluminium compounds. No disclosure of the use of silicon metal is made and carbon or silicon carbide must be used.

U.S. Pat. No. 4,360,506, inventor Paris R A, which discloses the formation of β'SiAlON's from a paste comprising silico-aluminous material (clay), carbon, and fine particles of a ligneous material (eg sawdust). The carbon and ligneous material are essential and no mention of the silicon metal is made.

U.S. Pat. No. 4,871,698, inventors Fishler et al, uses silicon metal in the production of a refractory body. The other constituents include carbon, β'-SiAlON, clay, silica and silicon carbide amongst others.

Other common methods for producing α'SiAlON's and β'SiAlON's include:

(i) Reaction Sintering of mixtures of two or more of the following: $Si_3N_4$, $SiO_2$, $Al_2O_3$, AlN, and AlN-polytypoids, at ≧1600° C. under a nitrogen atmosphere, usually in the presence of a rare earth sintering aid such as $Y_2O_3$ or CeO. This process involves expensive raw materials and high temperatures, but allows good control over the composition and purity of the product.

(ii) Carbothermal Reduction. Aluminosilicate minerals are blended with carbon and fired at ≧1350° C. under a flowing nitrogen atmosphere. This process is described as carbothermal reduction because the carbon acts by reducing the aluminosilicate, allowing nitridation to occur. This process involves cheap raw materials and lower firing temperatures than for reaction sintering but impurities in the aluminosilicate can degrade the properties of the product. The process is more difficult to control because it involves stopping a reaction at a specific point prior to completion.

(iii) Combustion Synthesis. A mixture containing silicon metal powder is ignited under a nitrogen atmosphere. The energy evolved by the strongly exothermic nitridation of silicon propagates a reaction front through the reaction mixture. This method is very rapid and energy efficient but is difficult to control.

Methods (ii) and (iii) both yield β'SiAlON powders which must then be formed and sintered to obtain a ceramic body. Method (i) is the most commonly used method for preparing α and β'SiAlON. As is apparent from above known methods, in order to get good control over the composition and purity of the product expensive raw materials and/or extreme reaction conditions are required.

It is an object of the invention to provide an improved process for the production of α' and β'SiAlONs.

SUMMARY OF THE INVENTION

The invention in a first aspect comprises a process for the production of α' or β'SiAlON from a starting mixture of silicon metal and clay, wherein the process comprises heating the mixture components in a flowing nitrogen, or nitrogen containing, atmosphere to a temperature sufficient to react the silicon and the nitrogen with the clay to form the β' or α'SiAlON and wherein the clay participates in the reaction as a source of aluminium and silicon.

The invention in a second aspect comprises a process for the production of α' or β'SiAlON from a starting mixture of silicon metal, clay and nitrogen wherein the process comprises dehydroxylating the clay, mixing the dehydroxylated clay with the silicon metal and heating the combination in a flowing nitrogen, or nitrogen containing, atmosphere to a temperature sufficient to react the mixture to form α' or β'SiAlON and wherein the clay participates in the reaction as a source of aluminium and silicon.

Preferably the clay content in the starting mixture is between 11 and 85% by weight, more preferably between 11 and 80% by weight and more preferably between 20 and 70% by weight.

Preferably the β'SiAlON formed by the process of the invention is within the composition range:

$$Si_{6-z}Al_zO_zN_{8-z}$$

where z is in the range of 0.1–3.0.

Preferably z is between 0.5 and 2.5 and more preferably between 0.5 and 1.5.

Preferably the α'SiAlON formed by the process of the invention has a composition characterised by the general formula:

$$M_{m/v}Si_{(m+n)}Al_{(m+n)}O_nN_{16-n}$$

where M is a metal cation having a valence v and where m and n indicate the replacement of (m+n) (Si—N) bonds by m(Al—N) and n(Al—O) bonds in the α-$Si_3N_4$ structure.

Preferably the α'SiAlON is formed from β'SiAlON having a z range between 0.1 and 2.0, and more preferably between 0.5 and 1.5.

Preferably the starting mixture further includes additives selected from carbon and silicon carbide.

Preferably the starting mixture further includes sintering aids selected from yttria, calcia, magnesia and/or lithia.

Preferably the clay contains a free silica component.

Preferably the atmosphere is substantially pure nitrogen, a hydrogen/nitrogen mixture, or ammonia.

Preferably the components of the mixture are present as fine powders.

Preferably the starting mixture contains, by weight, about 11% to about 80% clay, about 9% to about 89% silicon metal and 0% to about 20% carbon.

Preferably the flowing $N_2$ atmosphere comprises about ≦0.5% oxygen and about ≦0.5% water vapour.

Preferably the mixture is heated to between about 1100° C. and about 1900° C., more preferably between about 1350° C. and about 1900° C., more preferably between about 1400° C. and about 1750° C. and most preferably 1450° C.

Preferably the components are heated at a rate of between substantially about 1° C. and about 20° C. per minute, more preferably between 1° C. and 10° C. per minute, more preferably between about 1° C. and about 5° C. per minute. more preferably between about 1.5° C. and about 2.5° C. per minute and most preferably at about 2° C. per minute.

Preferably the components are held at the required temperature for up to about 12 hours and most preferably for up to about 8 hours.

Preferably the clay is a hydrated clay mineral and more preferably a Kaolin clay.

Preferably the clay is dehydroxylated prior to mixing with the silicon metal.

Preferably a ceramic material is included in the component mixture.

Preferably the ceramic material included in the mixture is selected from silicon carbide (SiC), alumina ($Al_2O_3$), aluminium nitride (AlN), silicon nitride ($Si_3N_4$), SiAlON, zirconia ($ZrO_2$) or silica ($SiO_2$).

Preferably the ceramic material included in the mixture will be coarser than the other mixture components which react to form the α' or β'SiAlON.

Preferably the ceramic material included in the mixture will constitute up to about 75% by weight of the mixture, and more preferably between about 40% and about 70% by weight of the mixture.

In more limited terms the invention in a third aspect comprises a process for the production of β' or α'SiAlON from a fine powder component mixture comprising substantially, by weight, 50% to 70% silicon metal, 20% to 40% clay, and 5 to 10% carbon, wherein the clay participates in the reaction as a source of aluminium and silicon, the process comprising the steps of:

a) heating the components at a rate of about 1.5° C. to about 10° C. per minute, to a temperature of about 1350° C. to 1900° C. under a flowing $N_2$ atmosphere having about ≦0.5% oxygen and about ≦0.5% water vapour;

(b) holding the temperature between about 1350° C. and about 1900° C. for up to about 8 hours; and (c) recovering the formed product.

In more limited terms the invention in a fourth aspect comprises a process for the production of a composite ceramic including β' or α'SiAlON from a mixture of fine powder components comprising, by weight, up to about 75% of a ceramic material and up to about 25% of a β or α'SiAlON forming mixture, wherein the β' or α'SiAlON forming mixture comprises substantially, by weight, 50% to 70% silicon metal, 20 to 40% clay, and 5 to 10% carbon, wherein the clay participates in the reaction as a source of aluminium and silicon the process comprising the steps of:

(a) heating the components at a rate of about 1.5° C. to about 10° C. per minute, to a temperature of substantially 1350° C. to 1900° C. under a flowing $N_2$ atmosphere having about ≦0.5% oxygen and about ≦0.5% water vapour;

(b) holding the temperature between about 1350° C. and about 1900° C. for up to about 8 hours; and (c) recovering the formed product.

Preferably the ceramic material included in the mixture will be coarser than the other mixture components which react to form the β' or α'SiAlON.

Preferably the ceramic material included in the mixture will constitute up to about 70% by weight of the mixture, and more preferably between about 40% and about 70% by weight of the mixture.

In more limited terms the invention in a fifth aspect comprises a process for the production of β'SiAlON having a composition in the range $$Si_{6-z}Al_zO_zN_{8-z}$$

where z has a value between 0.1 and 3.0, from a fine powder component mixture comprising substantially, by weight, 11%–85% clay, 9%–89% silicon metal and 0%–20% carbon, the process comprising the steps of:

a) heating the components at a rate of between substantially 1° C. and 20° C. per minute, to a temperature of substantially 1100° C. to 1750° C. under a flowing nitrogen or nitrogen containing atmosphere having about ≦0.5% oxygen and about ≦0.5% water vapour;

b) holding the temperature between about 1100° C. and about 1750° C. for up to about 12 hours; and c) recovering the product.

Preferably the clay is present in an amount of between 11% and 80% by weight.

Preferably the β'SiAlON formed has a z value in the range of between 0.1 and 2.0, more preferably between 0.5 and 1.5, and the reaction is allowed to continue for a time sufficient to form α'SiAlON having a composition characterised by the general formula:

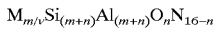

where M is a metal cation having a valence v and where m and n indicate the replacement of (m+n) (Si—N) bonds by m(Al—N) and n(Al—O) bonds in the α-$Si_3N_4$ structure.

BRIEF DESCRIPTION OF THE DRAWINGS

The attached Figures show a X-ray diffraction patterns of the α' and β'SiAlON products formed by the process of the invention. In the Figures.

Figure 1:
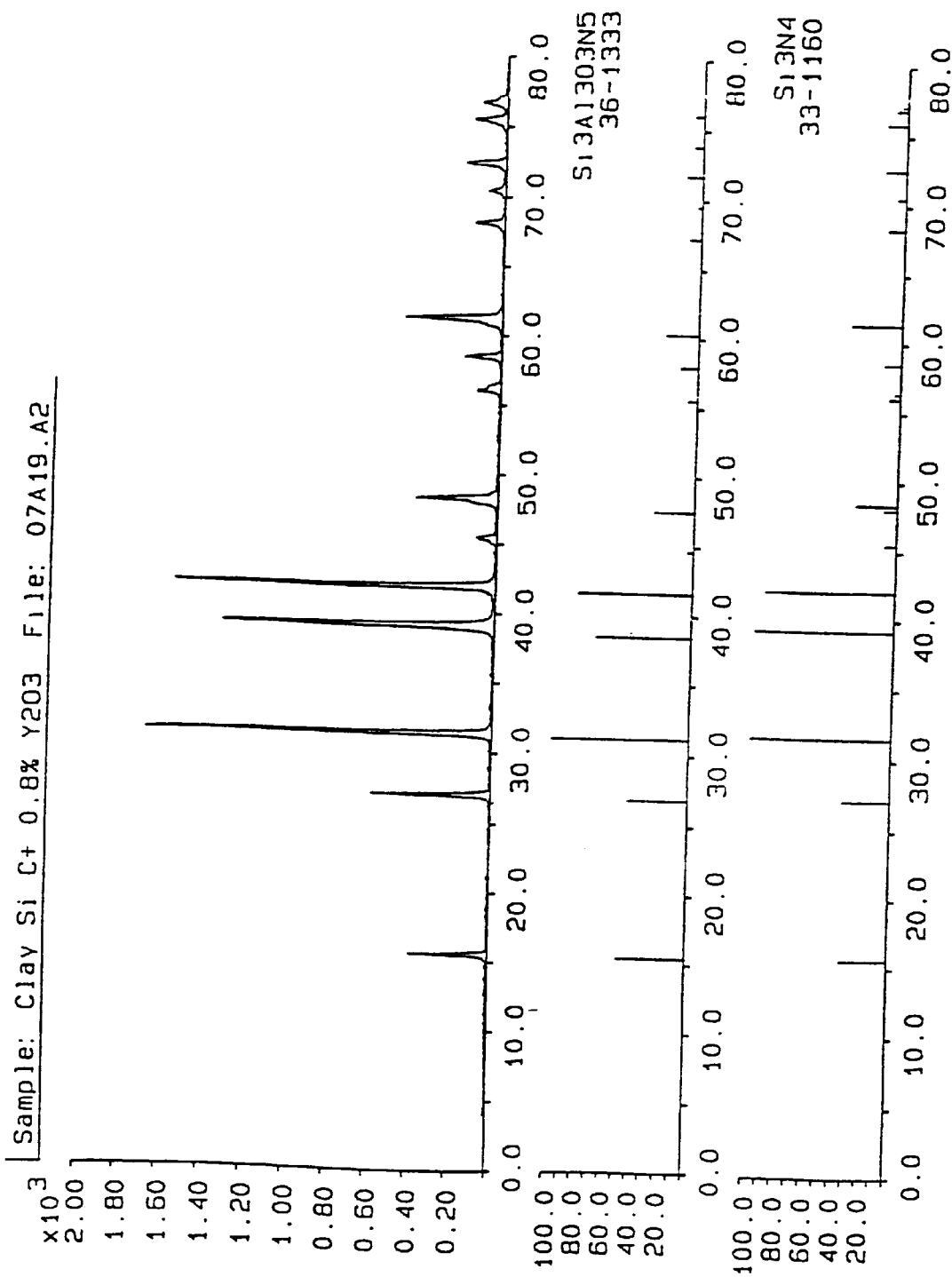
FIG. 1 shows a comparison between the X-ray diffraction pattern for the product formed by the process of Example 5 and standard β'SiAlON and silicon nitride patterns.

The standard α' and β'SiAlON X-ray diffraction pattern was supplied by the International Centre for Diffraction Data, USA and the product X-ray diffraction patterns were obtained from a Phillips 1700 Series Diffractometer controlled by Phillips APD1700 software.

DETAILED DESCRIPTION OF THE INVENTION

The process of the present invention is a novel process for preparing β' or α'SiAlON from fine powders of silicon metal, clay, (which may contain silica) and, for the production of some compositions, carbon, silicon carbide, yttria, calcia, magnesia or lithia. The clay may be dehydroxylated prior to use however retention of the clay in its natural plastic form will allow the mixture to be more readily formed into a desired shape prior to firing. The use of the clay material as a source of aluminium and silicon for the production of the SiAlON production allows the option of utilising the malleable properties of clay to be available. The product formed can thus be tailored for a specific use and can be produced very economically.

The β'SiAlON formed by the process of the invention can have a low z value of between 0.1 and 3.0. The low z value equates to a low aluminium content in the SiAlON.

When forming α'SiAlON, it is preferable that β'SiAlON having a z value of between 0.1 and 2.0 is formed first and the reaction is allowed to continue to form the α'SiAlON. The z value is more preferably between 0.5 and 1.5 in such cases with between 0.5 and 1.0 particularly preferred.

The raw materials may be blended by standard techniques such as ball milling or the like as will be known in the art. These raw materials are blended, formed into shapes by traditional methods of pressing, slip casting, or extruding and more advanced methods including isostatic pressing and injection moulding as will be known in the art, and then heated under a flowing nitrogen atmosphere to temperatures greater than 1400° C. at an appropriate rate, and held at this temperature for up to about 12 hours, although between 6 and 8 hours is generally seen to be sufficient. Longer holding times may be used as will be known in the art. The nitrogen flow rate should be as low as possible, but sufficient to maintain an atmosphere with preferably about ≦0.5% oxygen and about ≦0.5% water vapour inside the furnace. The oxygen and water vapour content of the atmosphere should be kept to a minimum as they can affect the process by attacking the silicon. During the reaction the nitrogen from the furnace atmosphere becomes incorporated into the product via a nitridation reaction giving an increase in density. The product is primarily α' or β'SiAlON, although O'-SiAlON, mullite and other SiAlON phases, such as X-phase SiAlON, may also be formed.

The carbon and silicon carbide, if used, act as reductants. Silicon metal may also act as a reductant. Yttria, calcia, magnesia, and other oxide additives, if used, will stabilise the α'SiAlON structure and will also assist sintering. Addition of these oxides in the mixture of raw materials promotes the reaction, reducing reaction time and temperature and increasing SiAlON yield.

Some reaction occurs during the heating stage, and therefore the holding step for up to 12 hours is optional, however the bulk of the product is formed between 1400° C. and 1450° C. as the silicon begins to melt (at approx 1414° C.). Holding the furnace at a temperature greater than 1450° C. is also optional but may be used to force the reaction to completion, or to sinter the body to obtain better densities. A heating rate of between 1° C. per minute and 5° C. per minute is considered suitable however, as may be seen in the Examples, heating rates of up to about 20° C. per minute may also be used. The preferred temperature range is between 1350° C. and 1750° C. as at higher temperatures specialised and more expensive kilns may be required. If impurities are present in the silicon then the melting point may be lowered. In such a case the reaction may proceed at lower temperatures. Temperatures as low as about 1100° C. are envisaged as being possible for the preparation of β'SiAlON. Such impurities include Fe, Ca and Mg for example as well as others as will be known in the art. For example in the case of Fe particularly, there is a eutectic between Fe and Si at about 1190° C. The required temperature may preferably be reached by incremental steps. For example the mixture may be heated to between about 80° C. and 130° C. (preferably about 110° C.) and held for up to about 3 hours to dry the mixture. The temperature may then be increased to between about 500° C. and 800° C. (preferably about 600° C.) and held for up to about 3 hours to remove the $H_2O$ formed as the clay dehydroxylates. The temperature may then be increased further to between about 950° C. and 1300° C. (preferably about 1250° C.) to remove the $CO_2$ which evolves as the calcite decomposes. Further incremental steps may be used as required in order to optimise the reaction. The holding times are preferably between 1 and 3 hours. The incremental steps are not essential to the process and may be varied as desired. Any figure or range of figures within the quoted ranges can be used as will be known in the art.

As will be readily apparent to a person skilled in the art, the type of furnace or kiln used must be able to maintain a controlled internal atmosphere at the temperatures required. Any type of furnace or kiln capable of this may be used.

It has been found that dehydroxylation of the clay prior to mixing is beneficial to the production of $\alpha'$ and $\beta'$SiAlON in pure form. For example, at 500–800° C. clay undergoes this dehydroxylation reaction to form a reactive amorphous intermediate as is well known in the art. This dehydroxylation will also occur when the process is carried out in a single firing (ie without prior dehydroxylation of the clay) thus one step processing of the material is possible. An example of the amorphous intermediate formed is meta-Kaolin from Kaolin clays. The formation of the amorphous intermediate will react with silicon and nitrogen to form silicon aluminium oxynitrides (SiAlONs) under suitable conditions. The amorphous intermediate is formed at relatively low temperatures and is reactive at those temperatures which facilitates the use of relatively low temperatures in the SiAlON forming process.

An example of the reaction to produce $\beta'$SiAlON (z=0.5) from New Zealand China Clays premium grade halloysite is shown in equation (1). The amount of each raw material must be balanced to provide the correct Si:Al:O:N:C ratio for the desired $\beta'$SiAlON as will be known in the art.

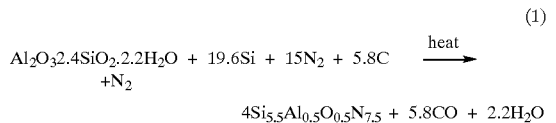

$$Al_2O_3 \cdot 2.4SiO_2 \cdot 2.2H_2O + 19.6Si + 15N_2 + 5.8C \xrightarrow[+N_2]{heat}$$
$$4Si_{5.5}Al_{0.5}O_{0.5}N_{7.5} + 5.8CO + 2.2H_2O \quad (1)$$

If the correct balance of raw materials is used then the production of $\beta'$SiAlON in the resultant ceramic is maximised. This balance of material will be able to be calculated readily by a person skilled in the art and will depend largely on the type of clay used in the reaction.

The process of the present invention allows the manufacture of low z SiAlON compositions (z<3), which have been shown to have desirable properties, much more readily than traditional methods. High z compositions (z>3) may also be made by the process of the invention but with aluminium in the starting mix.

The Industrial Research Limited et al PCT application (PCT/NZ95/00050) discloses the synthesis of O'-SiAlON from mixtures of clay and silicon, assuming no loss of gaseous species from the system. Use of carbon in the process of the present invention allows carbothermal reduction to occur which further increases the nitrogen content of the SiAlON product to form $\beta'$SiAlON. The use of carbon in the process, while very preferable, is not essential as can be seen from the Examples herein.

The process of the present invention is capable of producing products containing over 80% of $\beta'$SiAlON. The percentage of carbon used, by weight, can be as low as 0%. In such a case the proportions, by weight, of clay and silicon metal will be approximately 30% and 70% respectively. The preferred percentage makeup of the staring component is however and figure or range of figures between about 11% to about 85% (more preferably 80%) clay, about 15% to about 89% silicon metal and 0% to about 20% carbon.

As will be apparent to a person skilled in the art a variety of clays may be used in process. The preferred clays are hydrated clay minerals of which the kaolin clays are preferred. Other types of clay may also be used however most will contain a variety of impurities such as K, Na, Ca, Mg, and Fe together with the content. These impurities will affect the purity of the SiAlON product formed by the process.

As mentioned previously, water vapour inside the furnace due to dehydroxylation of the clay during firing can particularly prevent the silicon reacting. This can be minimised by dehydroxylating the clay before mixing with the silicon and silica. This may be achieved by methods such as precalcining as will be known in the art. Sintering aids such as $Y_2O_2$ can also be added to improve the density (see example 6). In addition $Y_2O_3$ can be added to the raw materials to promote the reaction, as can be seen in Example 5.

While the removal of water from the clay prior to firing will enhance the production of the SiAlON product, the step is not essential to the process. Dehydroxylation increases the purity of the product however the benefits of clay with regard to slip casting and extruding for example will no longer be available.

This process can also be used to fabricate composite ceramics, where $\beta'$SiAlON is used to bond together grains of other ceramic materials such as silicon carbide (SiC) (see example 5), alumina ($Al_2O_3$), silicon nitride ($Si_3N_4$), SiAlON, zirconia ($ZrO_2$) or silica ($SiO_2$). These bonded materials take little or no part in the reaction chemistry. They will preferably be coarser than the raw materials which react to form the bonding phase, and will preferably constitute between 1 and 70% of the starting mixture and thus of the fired ceramic. This additional ceramic material is bonded by a matrix of $\beta'$SiAlON formed by the other components in the starting mixture (ie the clay, silica, and silicon). These other components will therefore constitute between 30% and 99% of the total starting mixture and will be present in the preferred percentage amounts that have been discussed previously with respect to each other.

As clay constitutes a significant proportion of the starting mixture, this enables simple and inexpensive forming techniques to be used. Slip casting, extruding and the like are examples of such techniques. As will be known in the art more advanced forming methods such as isostatic pressing, injection moulding and the like may also be used. As a result there is a great flexibility in the shape and size of ceramic components which can be produced by the process of the present invention.

The reaction to form $\beta'$SiAlON is generally accompanied by an amount of shrinkage, however if $\beta'$SiAlON is used to bond another ceramic material and form a composite ceramic, as mentioned previously, this shrinkage can become negligible, allowing nearnett size shapes to be formed. The shapes formed by the forming technique may be of any form as desired.

The method of the present invention is capable of producing either ceramic bodies or ceramic powder containing the β'SiAlON is a single firing step. To make the ceramic powder the reaction proceeds without an emphasis on densification of the resultant ceramic. For example the starting materials can be formed into pellets, reacted to form a ceramic pellet of β'SiAlON which is then ground into a powder. This may then be used as a supply of β'SiAlON powder for use in other processes. For example the powder could be formed and sintered with sintering aids such as $Y_2O_3$, MgO or the like to form fully dense ceramic bodies.

EXAMPLES

The following examples exemplify preferred forms of the invention and are not intended to be limiting.

Example 1

Synthesis of β'SiAlON by Reacting Clay, Silicon, and Carbon with Nitrogen

A stoichiometric mixture to form β'SiAlON with z=0.5 was weighed out according to the following equation:

β'SiAlON z=0.5, from NZCC halloysite clay, silicon, and carbon

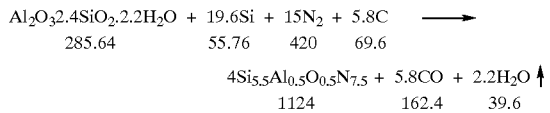

$$Al_2O_3 \cdot 2.4SiO_2 \cdot 2.2H_2O + 19.6Si + 15N_2 + 5.8C \longrightarrow$$
$$285.64 \quad\quad 55.76 \quad 420 \quad 69.6$$
$$4Si_{5.5}Al_{0.5}O_{0.5}N_{7.5} + 5.8CO + 2.2H_2O\uparrow$$
$$1124 \quad\quad 162.4 \quad 39.6$$

Wt % clay=31.53%
Wt % Si=60.79%
Wt % C=7.68% (+10%=8.45%)
Wt Gain=24.06%

Additional carbon (10% of the required amount) was included to cover small quantities of entrained and physically bound air and water.

The Mixture 6.31 g New Zealand China Clays Premium Grade Halloysite Clay 12.16 g Permascand 4D Silicon 1.69 g Degussa Lampblack 101

The 20 g mixture was blended by ball-milling with approximately 400 g of 10 mm diameter $Si_3N_4$ balls and 70 g of hexane in a 1 liter high density polyethylene (HDPE) bottle for 17 hours at approximately 150 rpm. The hexane solvent was removed by rotary evaporation. The dry powder was made plastic with water and extruded through a 3 mm circular orifice to yield a cylindrical rod which was dried at 110° C. and broken into short lengths (or pellets) 10–20 mm long.

Two pellets were fired in a horizontal tube furnace (40 mm diam tube) in a small alumina crucible under a flowing nitrogen atmosphere (approximately 100 ml.min$^{-1}$) at 10° C.min$^{-1}$ to 1350° C., held at that temperature for 4 hours, then heated at 10° C.min$^{-1}$ to 1450° C. and held at that temperature for 8 hours.

The pellets increased in mass by 14% during the firing, and an analysis of the products by X-ray powder diffraction (XRD) revealed primarily β'SiAlON with small amounts of O'-SiAlON and traces of silicon carbide.

Example 2

Synthesis of β'SiAlON samples with a range of Aluminium Contents

Stoichiometric mixtures to form β'SiAlON with z=0.25, 0.5, 0.7, 1, and 2 were calculated, weighed out, blended, extruded, and fired as described in Example 1. Analyses of the products by X-ray powder diffraction (XRD) revealed primarily β'SiAlON with small amounts of O'-SiAlON and traces of silicon carbide. The β'SiAlON content increased with z value, the "z=1" and "z=2" samples consisting entirely of β'SiAlON.

The crystalline phases present were determined by X-ray diffraction. The aluminium content of the SiAlON (represented by the z value in the general formula $Si_{6-z}Al_zO_zN_{8-z}$) was measured by X-ray diffraction using a rapid method developed by Ekström [J Mat Sci., 24 1989 1853.] and adapted at Industrial Research Ltd. The method calculates z value from the position of one SiAlON diffraction peak.

Example 3

Use of Silicon Carbide as Reductant

A stoichiometric mixture to form β'SiAlON with z=0.5 was weighed out according to the following equation:

β'Sialon z=0.5, from NZCC halloysite clay, silicon, and silicon carbide 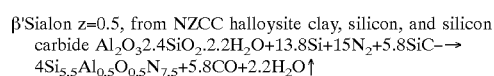
$Al_2O_3 \cdot 2.4SiO_2 \cdot 2.2H_2O+13.8Si+15N_2+5.8SiC-\rightarrow$
$4Si_{5.5}Al_{0.5}O_{0.5}N_{7.5}+5.8CO+2.2H_2O\uparrow$ Additional carbon (10% of the required amount) was included to cover small quantities of entrained and physically bound air and water.

The 2 g mixture was blended by hand in an agate mortar. The dry powder was fired in a horizontal tube furnace (40 mm diam tube) in a small alumina crucible under a flowing nitrogen atmosphere (approximately 100 ml.min$^{-1}$) at 10° C.min$^{-1}$ to 1350° C., held at that temperature for 4 hours, then heated at 10° C.min$^{-1}$ to 1450° C. and held at that temperature for 8 hours.

The sample increased in mass during the firing, and an analysis of the products by X-ray powder diffraction (XRD) revealed primarily β'SiAlON with small amounts of O'-SiAlON.

Example 4

Use of yttria to promote synthesis.

A stoichiometric mixture to form β'SiAlON with z=0.5 was weighed out according to the recipe given in Example 1 with approximately 0.8% yttria added (calculated as a % of the theoretical final SiAlON mass).

A Mixture of 6.31 g New Zealand China Clays Premium Grade Halloysite Clay 12.16 g Permascand 4D Silicon 1.69 g Degussa Lampblack 101

0.2 g Sigma Yttrium Oxide ($Y_2O_3$)

was blended, formed into pellets, and fired as described in Example 1.

The pellets with approximately 0.8% yttria (calculated as a % of the theoretical final SiAlON mass) increased in mass by 13.2% during the firing, and an analysis of the products by X-ray powder diffraction (XRD) revealed β'SiAlON alone.

Example 5

Use of yttria to promote synthesis.

Figure 2:
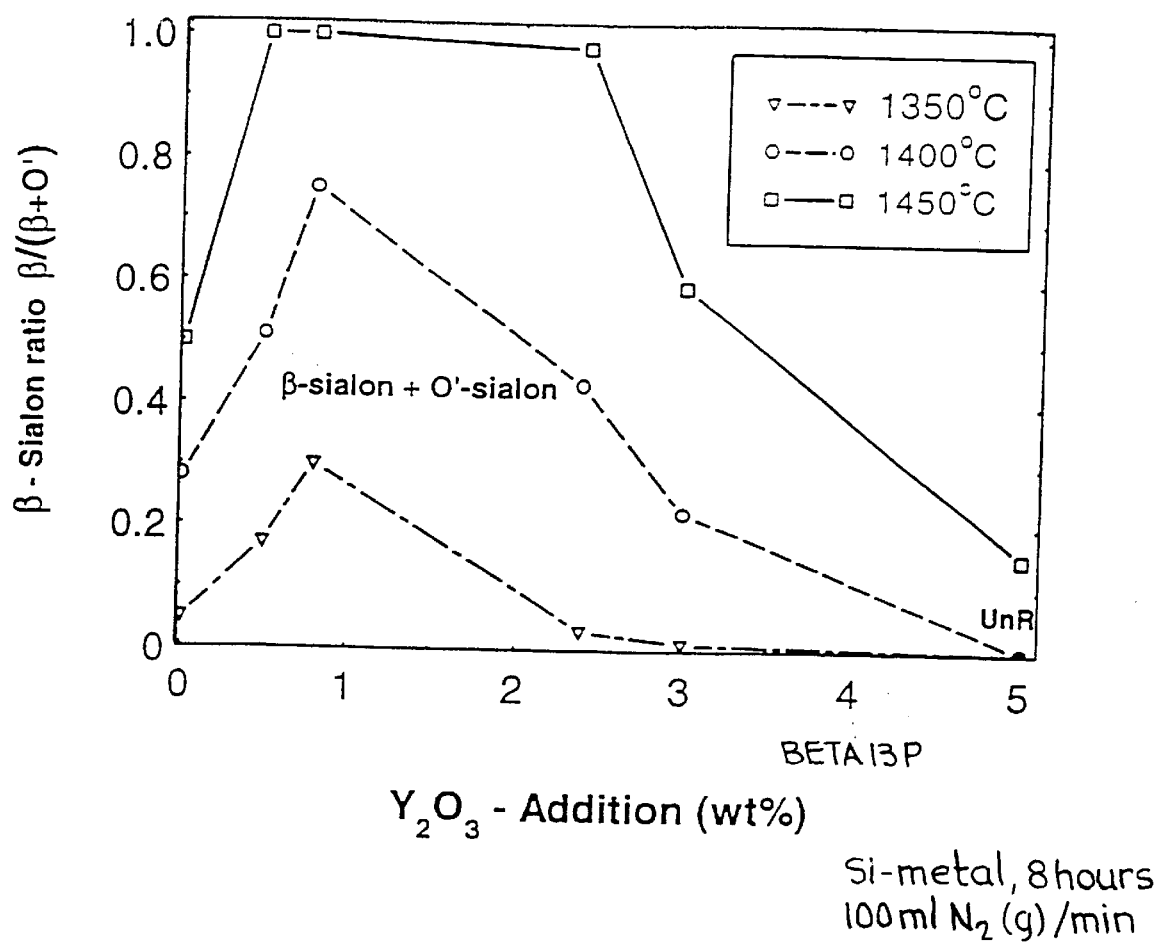
FIG. 2 shows a graph of β' SiAlON ratio against $Y_2O_3$ addition at varying temperatures.

The mixture described in Example 1 was prepared in 20 g batches with yttria contents (calculated as a % of the theoretical final SiAlON mass) of 0.5, 0.8, 2.4, 3, and 5%. These were fired in a tube furnace as described in Example 1 for 8 hours at three temperatures 1350, 1400, 1450° C. The analysis of the products by X-ray powder diffraction (XRD), as shown in FIG. 1, revealed primarily β'SiAlON at 1450° C. with mixtures of O'-SiAlON and β'SiAlON at lower temperatures. An optimum yttria content of 0.5 to 2.4% is shown in FIG. 2.

Example 6

Use of yttria to promote synthesis and aid sintering.

The mixture described in Example 4 was prepared in 200 g batches and fired in a vertical graphite tube installed in a vacuum sintering furnace with graphite heating elements. The same heating schedule was employed with a nitrogen flow in a 50 mm diameter tube.

The resulting SiAlON pellets were ball milled for 16 hours in ethanol using High Density Polyethylene (HDPE) bottles and $Si_3N_4$ milling media.

Oleic acid was chosen as a lubricant pressing aid and binder as it could be removed completely from the test pieces after forming by heating in nitrogen to 450° C. The oleic acid was added to the mill at 5 wt % relative to the total dry powder and the blend remilled for a further 15 minutes.

The resultant slurry was filtered through 10 μm cloth to remove agglomerates and a laboratory magnetic stirrer was used to rotate a plastic coated magnet on top of the filter cloth (see diagram page in appendix). This serves to collect magnetic particles and to break agglomerates, allowing the de-agglomerated material to pass through the cloth.

The slurry with ethanol was dried to near dryness in a rotary evaporator after filtering through the 10 micron filter. This was intended to minimise phase separation during drying and prevent airborne contamination during drying.

The damp powder was granulated through a 500 μm sieve prior to fabrication into 30 mm dia. discs. These discs were uniaxially pressed at up to 35 MPa, and one set of samples was uniaxially pressed at 7 MPa and then pressed in a cold isostatic press at 400 MPa.

The test specimens were heated under $N_2$ to 450° C. at 0.5° $C.min^{-1}$ to remove the oleic acid and were then fired under $N_2$ immersed in a SiAlON powder bed containing a small proportion of added silica in a *Thermal Technology* graphite resistance furnace to 1550° C.–800° C. at 20° C. per minute, held at top temperature for 1 hour, and allowed to cool naturally.

The discs were composed entirely of β'SiAlON (by XRD), apart from a surface skin, after heating while immersed in a SiAlON powder bed containing a small proportion of added silica, for one hour at 1600° C. in a *Thermal Technology* graphite resistance furnace under a protective nitrogen atmosphere.

Fired specimens were ground and polished plane parallel into 1.5 mm thick discs suitable for biaxial strength measurement using the ball on ring method [4]. Discs >20 mm dia. were supported on a 17 mm dia. ring of steel balls and loaded to failure via a central ball using an Instron testing machine. The calculated strength varies with the Poisson's ratio of the material. The elastic properties were calculated from the speed of sound measured in the material.

After heating for one hour at 1700° C. under nitrogen the disc exhibited an apparent porosity of 0.1% and a bulk density of 93% of theoretical. Young's Modulus was found to be 295 GPa and Poisson ratio=0.25. These figures are comparable to those obtained for the z=2.7 SiAlON made from clay and carbon alone. With increasing porosity the Young's modulus remained constant but the strength increased to 583 MPa at 0.37% apparent porosity.

Example 7

Silicothermic Reduction—use of silicon metal as reductant

A stoichiometric mixture to form β'SiAlON with z=0.5 was weighed out according to the following equation:

β'SiAlON z=0.5, from NZCC halloysite clay and silicon

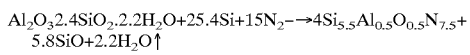

$Al_2O_3.2.4SiO_2.2.2H_2O+25.4Si+15N_2 \rightarrow 4Si_{5.5}Al_{0.5}O_{0.5}N_{7.5} + 5.8SiO+2.2H_2O\uparrow$ Wt % clay 28.6%
Wt % Si=71.4%
Wt Gain=12.5%
The Mixture
  0.572 g New Zealand China Clays Premium Grade Halloysite Clay
  1.428 g Permascand 4D Silicon The 2 g mixture was blended by hand in an agate mortar. An 0.4 g disc (10 mm diam.) was formed from the powder mixture by uniaxial pressing at 8 MPa pressure and was fired in a horizontal tube furnace (40 mm diam tube) in a small alumina crucible under a flowing nitrogen atmosphere (approximately 100 $ml.min^{-1}$) at 10° $C.min^{-1}$ to 1350° C., held at that temperature for 4 hours, then heated at 10° $C.min^{-1}$ to 1450° C. and held at that temperature for 8 hours.

The sample increased in mass by 23.6% during the firing, and an analysis of the products by X-ray powder diffraction (XRD) revealed primarily β'SiAlON (z=0.2) with a small quantity of a silicon nitride.

Example 8

Silicothermic Reduction with yttria additive.

A stoichiometric mixture to form β'SiAlON with z=0.5 was weighed out according to the equation given in Example 7 above and 3 weight % yttrium oxide was added. A sample disc was formed from this mixture and fired as described in Example 7.

The sample increased in mass by 17% during the firing, and an analysis of the products by X-ray powder diffraction (XRD) revealed only β'SiAlON (z=0.42).

Example 9

Reaction bonding β'SiAlON.

The mixture described in Example 5 with 3% yttria content (calculated as a % of the theoretical final SiAlON mass) was prepared in 2 g batches. The 2 g mixture was blended by hand in an agate mortar. An 0.4 g disc (10 mm diam.) was formed from the powder mixture by uniaxial pressing at 8 MPa pressure and was fired in a horizontal tube furnace (40 mm diam tube) in a small alumina crucible under a flowing nitrogen atmosphere (approximately 100 $ml.min^{-1}$) at 10° $C.min^{-1}$ to 1100° C., then at 1° $C.min^{-1}$ to 1450° C., and held at that temperature for 12 hours, then allowed to cool naturally.

The sample increased in mass by 16.7% during the firing, and an analysis of the products by X-ray powder diffraction (XRD) revealed β'SiAlON (z=0.2).

The bulk density and open porosity of the fired pellets were measured by immersion in water:

bulk density=1.6 g.cm$^3$ apparent porosity=46.2%

Example 10

Reaction bonding silicon carbide with β'SiAlON.
A Mixture of

60% Navarro 36-grit silicon carbide (SiC)

40% the mixture from Example 9

The 2 g mixture was blended by hand in an agate mortar. An 0.4 g disc (10 mm diam.) was formed from the powder mixture and fired as described for Example 9.

The sample increased in mass by 12.9% during the firing, and an analysis of the products by X-ray powder diffraction (XRD) revealed primarily SiC and β'SiAlON. The bulk density and open porosity of the fired pellets were measured by immersion in water:

bulk density=2.1 g.cm$^3$ apparent porosity=31.1%

Example 11

Synthesis of α'SiAlON in one step.
A Mixture of 1.063 g New Zealand China Clays Premium Grade Halloysite Clay 0.655 g Permascand 4D Silicon 0.348 g Degussa Lampblack 101

0.19 g Sigma Yttrium Oxide ($Y_2O_3$)

The powder mixture was blended by hand in an agate mortar and fired in small alumina crucibles under $N_2$ immersed in a *Thermal Technology* graphite resistance furnace to 1600° C. at 20° C. per minute, held at top temperature for 1 hour, and allowed to cool naturally.

Analysis of the products by X-ray powder diffraction (XRD) revealed primarily α'SiAlON with β'SiAlON and melilite (ICDD JCPDS 28-1457) also present.

Example 12

Synthesis of Ca α'SiAlON by reacting calcite, clay, silicon, and carbon with nitrogen.

A stoichiometric mixture to form Ca α'SiAlON with m=1.5, n=0.75 was weighed out according to the following equation:

Silicothermal/carbothermal reduction and nitridation to form
$Ca_{0.75}Si_{9.75}Al_{2.25}O_{0.75}N_{1.5}0.75CaCO_3+$
$1.125Al_2O_32.4SiO_2.2.2H_2O+7.05Si+8.78C \rightarrow$
$Ca_{0.75}Si_{9.75}Al_{2.25}O_{0.75}N_{1.5}+8.78CO+0.75CO_2+2.475H_2O$ Wt % calcite=6.86%

Wt % clay=29.36%

Wt % Si=38.70%

Wt % C=25.08% (+10%=27.59%)

Wt Loss=15.7%

Additional carbon (10% of the required amount) was included to cover small quantities of entrained and physically bound air and water.

The Mixture 2.54 g BDH Chemicals Ltd. Analytical Reagent Calcite 10.89 g New Zealand China Clays Premium Grade Halloysite Clay 6.71 g Permascand 4D Silicon 3.925 g Degussa Lampblack 101

The mixture was blended by ball-milling with approximately 400 g of 10 mm diameter $Si_3N_4$ balls and 70 g of hexane in a 1 liter high density polyethylene (HDPE) bottle for 17 hours at approximately 150 rpm. The hexane solvent was removed by rotary evaporation. The dry powder was uniaxially pressed to 8 MPa in a 13 mm diameter steel die to form pellets approximately 0.3 g. in weight.

The pellet was fired in a horizontal tube furnace (40 mm diam tube) in a small alumina crucible under a flowing nitrogen atmosphere (approximately 100 mi.min$^{-1}$) at 5° C.min$^{-1}$ to 600° C., held at that temperature for 1 hour, then heated at 5° C.min$^{-1}$ to 800° C. and held at that temperature for 2 hours, then heated at 5° C.min$^{-1}$ to 1550° C. and held at that temperature for 7 hours, then cooled at 10° C.min$^{-1}$ until the natural cooling rate of the furnace was slower than 10° C.min$^{-1}$ after which it was allowed to cool to room temperature and the sample was recovered.

Figure 3:
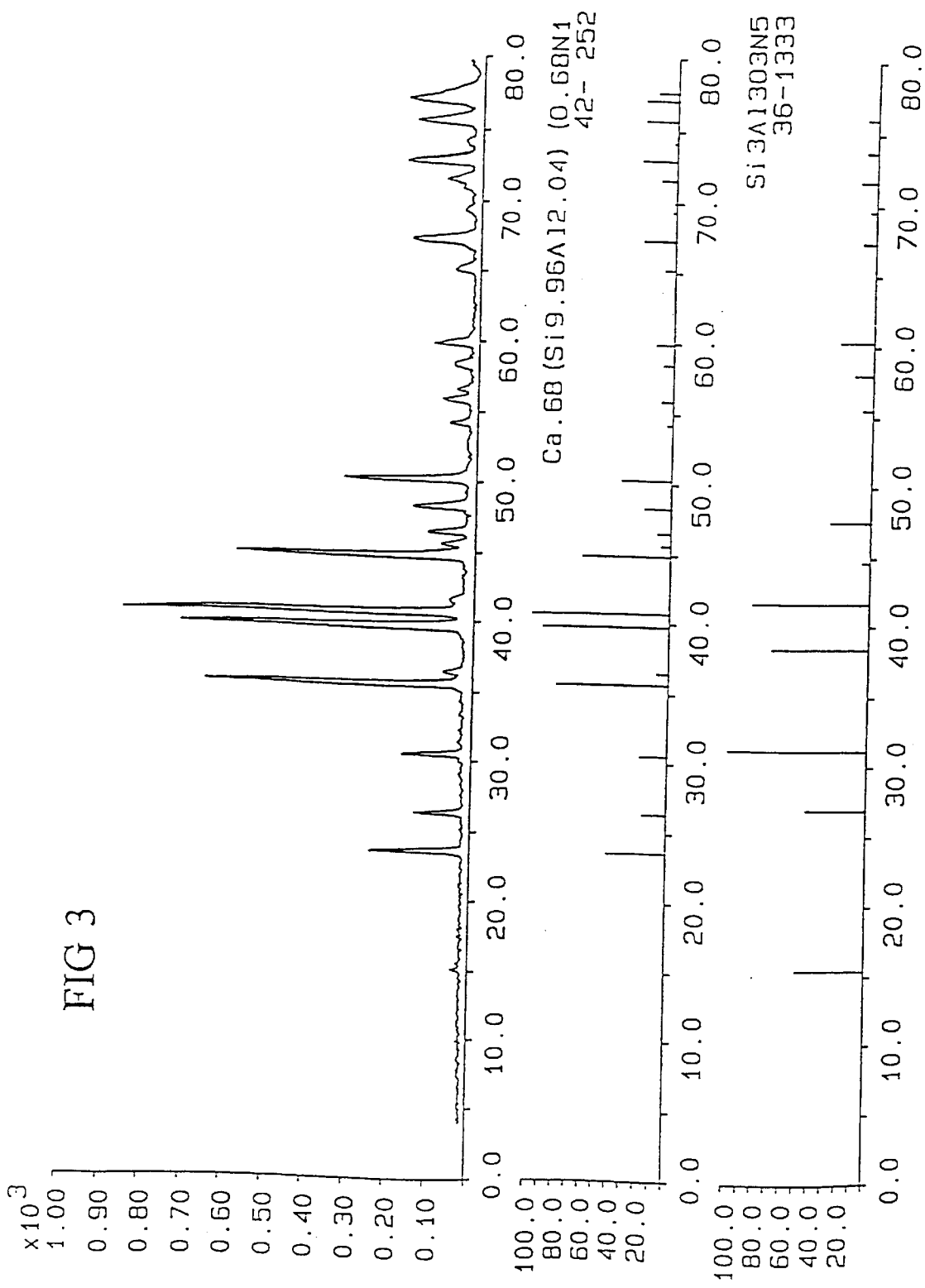
FIG. 3 shows a comparison between the X-ray diffraction pattern for the product formed by the process of Example 12 and a standard XRD patterns.
Figure 4:
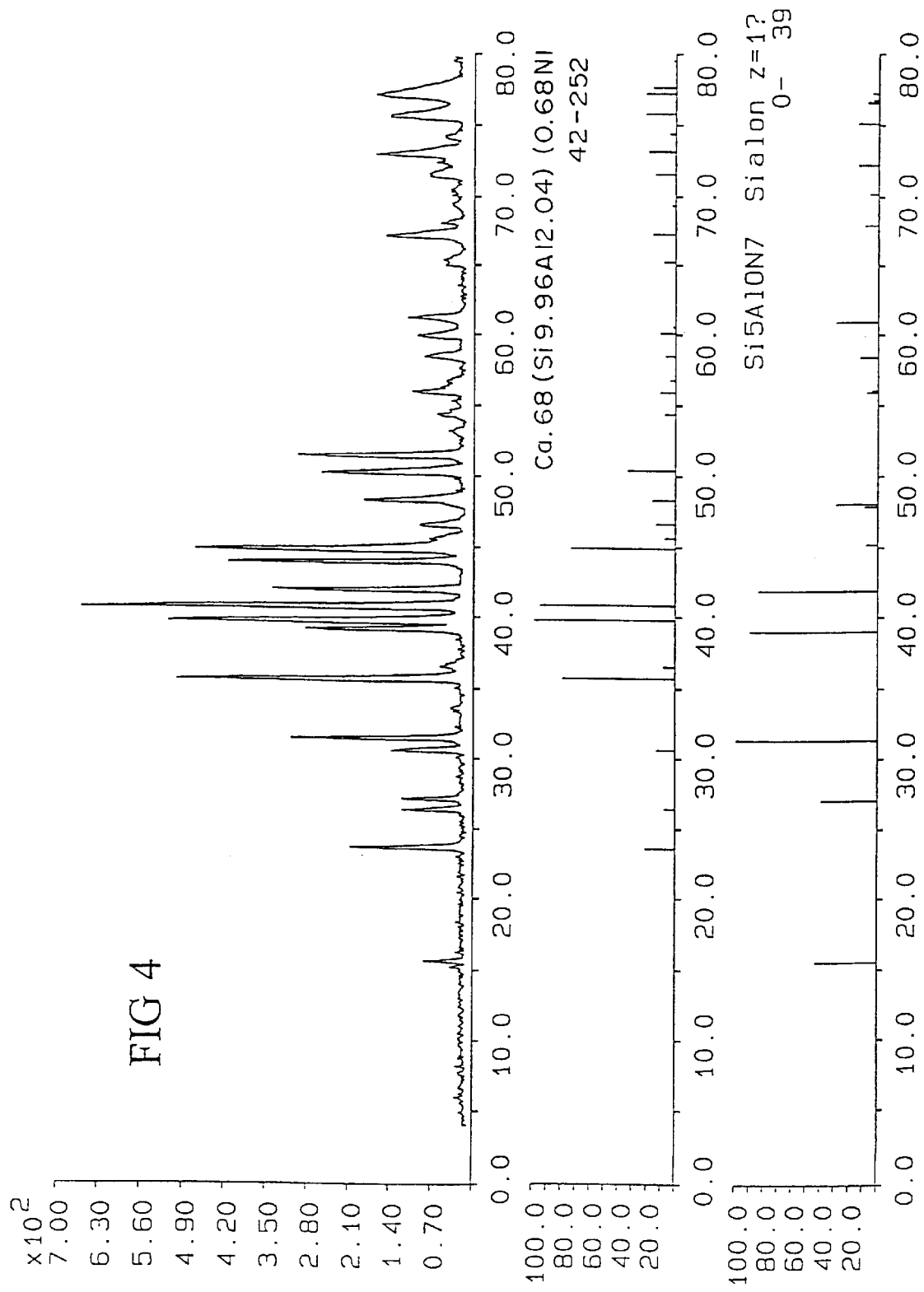
FIG. 4 shows a comparison between the X-ray diffraction pattern for the product formed by the process of Example 13 and standard XRD patterns.

The pellet decreased in mass by 22.5% during the firing, and an analysis of the products by X-ray powder diffraction (XRD) as shown in FIG. 4, revealed primarily Ca α'SiAlON with small amounts of β'SiAlON as shown in the attached XRD pattern in FIG. 3.

Example 13

Synthesis of Ca α'SiAlON by reacting calcite, clay, and silicon, with nitrogen.

A stoichiometric mixture to form Ca α'SiAlON with m=1.5, n=0.75 was weighed out according to the following equation :

Silicothermal reduction and nitridation to form
$Ca_{0.75}Si_{9.75}Al_{2.25}O_{0.75}N_{1.5}0.75CaCO_3+$
$1.125Al_2O_32.4SiO_2.2.2H_2O+7.05Si+8.78Si® \rightarrow$
$Ca_{0.75}Si_{9.75}Al_{2.25}O_{0.75}N_{1.5}+8.78SiO+0.75CO_2+2.475H_2O$ The silicon expected to form SiO vapour is expressed separately as Si®.

Wt % calcite=8.93%

Wt % clay=38.21%

Wt % Si=23.55%

Wt % Si®=29.31%

Total % Si=52.86%

Wt Loss=29.8%

The Mixture 2.54 g BDH Chemicals Ltd. Analytical Reagent Calcite 10.89 g New Zealand China Clays Premium Grade Halloysite Clay 15.065 g Permascand 4D Silicon The mixture was blended by ball-milling with approximately 400 g of 10 mm diameter $Si_3N_4$ balls and 70 g of hexane in a 1 liter high density polyethylene (HDPE) bottle for 17 hours at approximately 150 rpm. The hexane solvent was removed by rotary evaporation. The dry powder was uniaxially pressed to 8 MPa in a 13 mm diameter steel die to form pellets approximately 0.3 g. in weight.

The pellet was fired in a horizontal tube furnace (40 mm diam tube) in a small alumina crucible under a flowing nitrogen atmosphere (approximately 100 ml.min$^{-1}$) at 5° C.min$^{-1}$ to 110° C., held at that temperature for 2 hours, then heated at 5° C.min$^{-1}$ to 600° C., held at that temperature for 1 hour, then heated at 5° C.min$^{-1}$ to 800° C. and held at that temperature for 2 hours, then heated at 1° C.min$^{-1}$ to 1250° C. and held at that temperature for 4 hours, then heated at 1° C.min$^{-1}$ to 1400° C. and held at that temperature for 8 hours, then heated at 5° C.min$^{-1}$ to 1650° C. and held at that temperature for 8 hours, then cooled at 10° C.min$^{-1}$ until the natural cooling rate of the furnace was slower than 10° C.min$^{-1}$ after which it was allowed to cool to room temperature and the sample recovered.

The pellet decreased in mass by 33.8% during the firing, and an analysis of the products by X-ray powder diffraction (XRD), as shown in FIG. 4, revealed primarily Ca α'SiAlON with a small amount of β'SiAlON.

Example 14

Synthesis of Ca α'SiAlON by reacting calcite, clay, silicon and silicon carbide, with nitrogen.

A stoichiometric mixture to form Ca α'SiAlON with m=1.5, n=0.75 was weighed out according to the following equation:

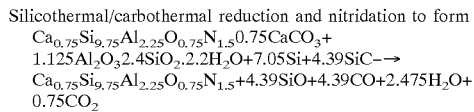

Silicothermal/carbothermal reduction and nitridation to form
$Ca_{0.75}Si_{9.75}Al_{2.25}O_{0.75}N_{1.5}$ 0.75CaCO$_3$+
1.125Al$_2$O$_3$2.4SiO$_2$.2.2H$_2$O+7.05Si+4.39SiC-→
$Ca_{0.75}Si_{9.75}Al_{2.25}O_{0.75}N_{1.5}$+4.39SiO+4.39CO+2.475H$_2$O+0.75CO$_2$ The silicon carbide was included as a reductant.
Wt % calcite 9.86%
Wt % clay=42.21%
Wt % Si=21.76%
Wt % SiC=21.76% (+10%=23.93%).
Wt Loss=22.4%
The Mixture
  0.13 g BDH Chemicals Ltd. Analytical Reagent Calcite
  0.545 g New Zealand China Clays Premium Grade Halloysite Clay
  0.309 g Navarro #1000 C5 Silicon Carbide
  0.336 g Permascand 4D Silicon The mixture was blended by dry grinding by hand in an agate mortar. The dry powder was uniaxially pressed to 8 MPa in a 13 mm diameter steel die to form pellets approximately 0.3 g. in weight.

The pellet was fired in a horizontal tube furnace (40 mm diam tube) in a small alumina crucible under a flowing nitrogen atmosphere (approximately 100 ml.min$^{-1}$) at 5° C.min$^{-1}$ to 110° C., held at that temperature for 2 hours, then heated at 5° C.min$^{-1}$ to 600° C., held at that temperature for 1 hour, then heated at 5° C.min$^{-1}$ to 800° C. and held at that temperature for 2 hours, then heated at 1° C.min$^{-1}$ to 125° C. and held at that temperature for 4 hours, then heated at 1° C.min$^{-1}$ to 1400° C. and held at that temperature for 8 hours, then heated at 5° C.min$^{-1}$ to 1650° C. and held at that temperature for 8 hours, then cooled at 10° C.min$^{-1}$ until the natural cooling rate of the furnace was slower than 10° C.min$^{-1}$ after which it was allowed to cool to room temperature and the sample recovered.

Figure 5:
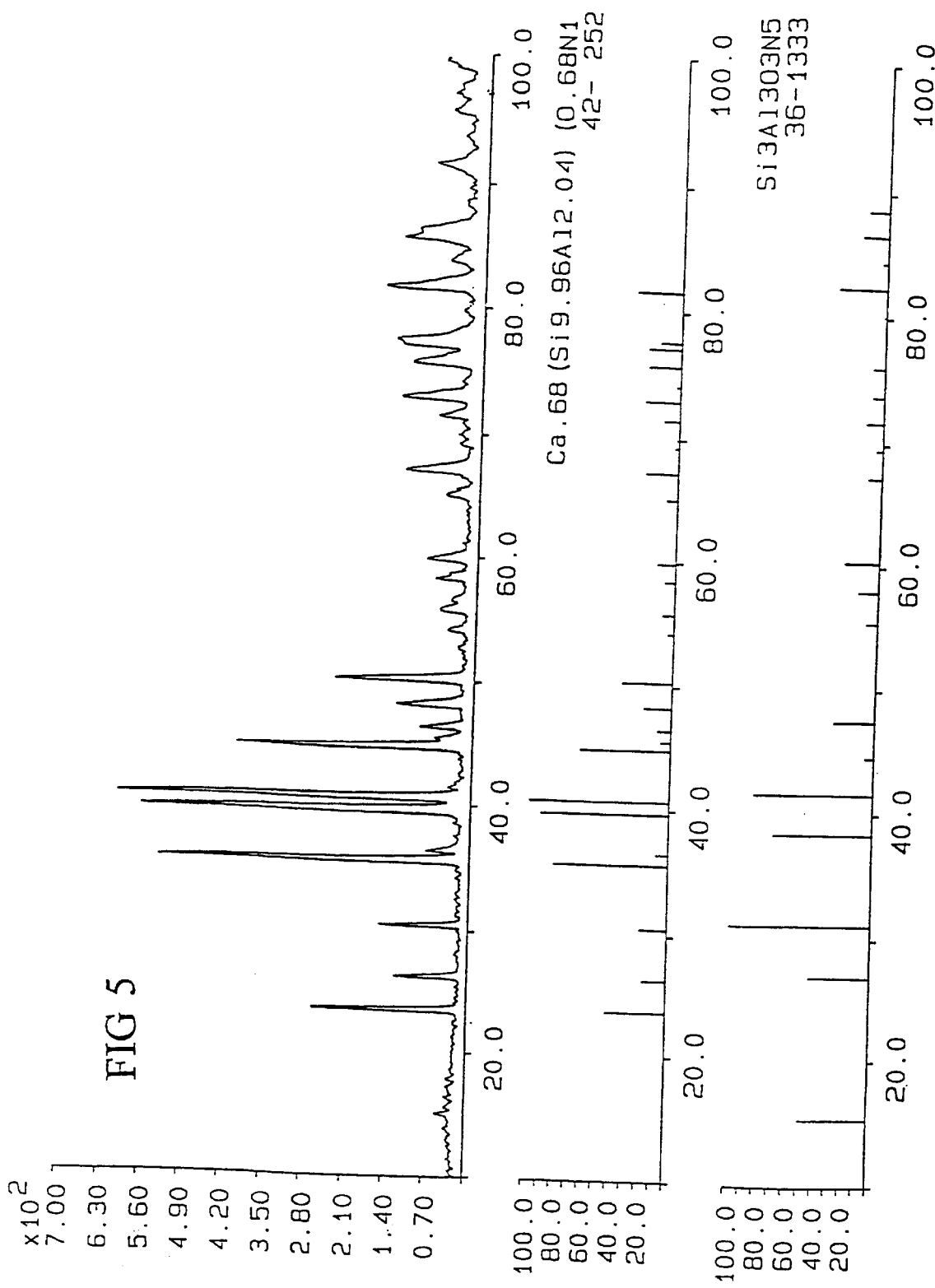
FIG. 5 shows a comparison between the X-ray diffraction pattern for the product formed by the process of Example 14 and standard XRD patterns.

The pellet decreased in mass by 36.7% during the firing, and an analysis of the products by X-ray powder diffraction (XRD) as shown in FIG. 5, revealed Ca α'SiAlON.

Example 15

Synthesis of a composite of with Li α'SiAlON with β'SiAlON by reacting spodumene (LiAlSi$_2$O$_6$), clay, silicon, and carbon with nitrogen.

A stoichiometric mixture to form Li α'SiAlON with m=1.5, n=0.75 was weighed out according to the following equation:

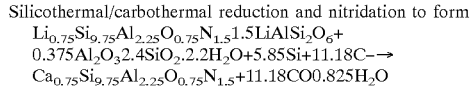

Silicothermal/carbothermal reduction and nitridation to form
$Li_{0.75}Si_{9.75}Al_{2.25}O_{0.75}N_{1.5}$1.5LiAlSi$_2$O$_6$+
0.375Al$_2$O$_3$2.4SiO$_2$.2.2H$_2$O+5.85Si+11.18C-→
$Ca_{0.75}Si_{9.75}Al_{2.25}O_{0.75}N_{1.5}$+11.18CO0.825H$_2$O Wt % spodumene=41.47%
Wt % clay=15.91%
Wt % Si=24.41%
Wt % C=18.32% (+10%=20.16%)
Wt Loss=15.4%

Additional carbon (10% of the required amount) was included to cover small quantities of entrained and physically bound air and water.
The Mixture
  0.49 g Spodumene
  0.188 g New Zealand China Clays Premium Grade Halloysite Clay
  0.288 g Permascand 4D Silicon
  0.238 g Degussa Lampblack 101

The mixture was blended by dry grinding by hand in an agate mortar. The dry powder was uniaxially pressed to 8 MPa in a 13 mm diameter steel die to form pellets approximately 0.3 g. in weight.

The pellet was fired in a horizontal tube furnace (40 mm diam tube) in a small alumina crucible under a flowing nitrogen atmosphere (approximately 100 ml.min$^{-1}$) at 5° C.min$^{-1}$ to 110° C., held at that temperature for 2 hours, then heated at 5° C.min$^{-1}$ to 600° C., held at that temperature for 1 hour, then heated at 5° C.min$^{-1}$ to 800° C. and held at that temperature for 2 hours, then heated at 1° C.min$^{-1}$ to 1250° C. and held at that temperature for 4 hours, then heated at 1° C.min$^{-1}$ to 1400° C. and held at that temperature for 8 hours, then heated at 5° C.min$^{-1}$ to 1650° C. and held at that temperature for 8 hours, then cooled at 10° C.min$^{-1}$ until the natural cooling rate of the furnace was slower than 10° C.min$^{-1}$ after which it was allowed to cool to room temperature and the sample recovered.

Figure 6:
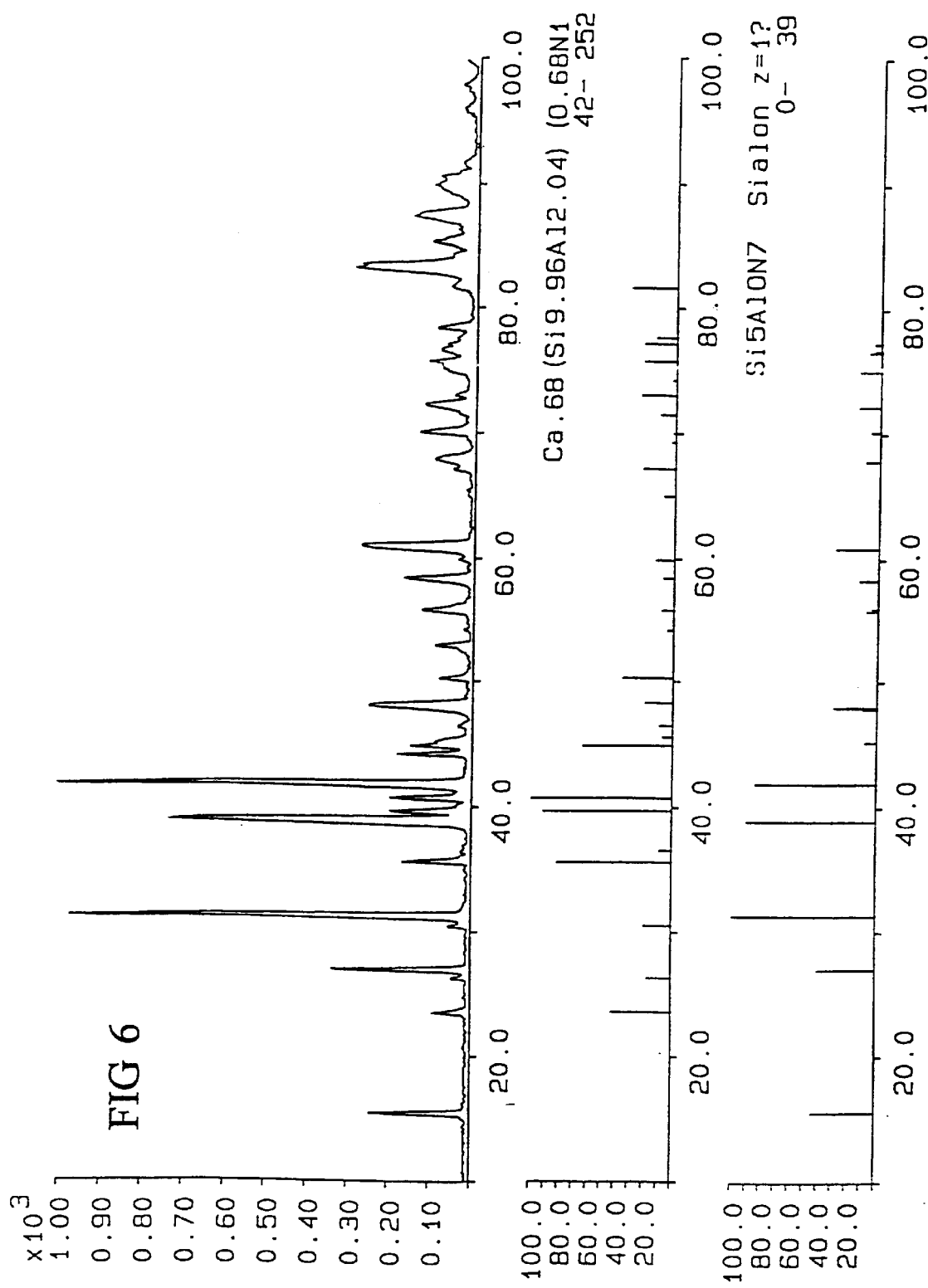
FIG. 6 shows a comparison between the X-ray diffraction pattern for the product formed by the process of Example 15 and standard XRD patterns.

The pellet decreased in mass by 32.9% during the firing, and an analysis of the products by X-ray powder diffraction (XRD), as shown in FIG. 6, revealed primarily β'SiAlON with Li α'SiAlON present in smaller proportion. The result was effectively a composite of with Li α'SiAlON with β'SiAlON.

Example 16

Synthesis of a composite of Y α'SiAlON with β'SiAlON by reacting yttria, clay, silicon, and carbon with nitrogen.

A stoichiometric mixture to form Yα'SiAlON with m=1.5, n=0.75 was weighed out according to the following equation:

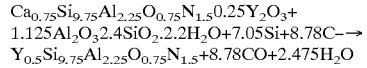

Silicothermal/carbothermal reduction and nitridation to form
$Ca_{0.75}Si_{9.75}Al_{2.25}O_{0.75}N_{1.5}$0.25Y$_2$O$_3$+
1.125Al$_2$O$_3$2.4SiO$_2$.2.2H$_2$O+7.05Si+8.78C-→
$Y_{0.5}Si_{9.75}Al_{2.25}O_{0.75}N_{1.5}$+8.78CO+2.475H$_2$O Wt % yttria=5.25%
Wt % clay=29.86%
Wt % Si=39.37%
Wt % C=25.51% (+10%=28.06%)
Wt Loss=43.8%

Additional carbon (10% of the required amount) was included to cover small quantities of entrained and physically bound air and water.
The Mixture
  1.87 g HC Starck fine grade Lot 1/94 Yttrium Oxide
  10.63 g New Zealand China Clays Premium Grade Halloysite Clay
  14.015 g Permascand 4D Silicon
  9.981 g Degussa Lampblack 101

The mixture was blended by ball-milling with approximately 400 g of 10 mm diameter Si$_3$N$_4$ balls and 70 g of hexane in a 1 liter high density polyethylene (HDPE) bottle for 17 hours at approximately 150 rpm. The hexane solvent was removed by rotary evaporation. The dry powder was uniaxially pressed to 8 MPa in a 13 mm diameter steel die to form pellets approximately 0.3 g. in weight.

The pellet was fired in a horizontal tube furnace (40 mm diam tube) in a small alumina crucible under a flowing nitrogen atmosphere (approximately 100 ml.min$^{-1}$) at 5° C.min$^{-1}$ to 600° C., held at that temperature for 1 hour, then heated at 5° C.min$^{-1}$ to 800° C. and held at that temperature for 2 hours, then heated at 5° C.min$^{-1}$ to 1450° C. and held at that temperature for 7 hours, then cooled the natural cooling rate of the furnace to room temperature and the sample recovered.

Figure 7:
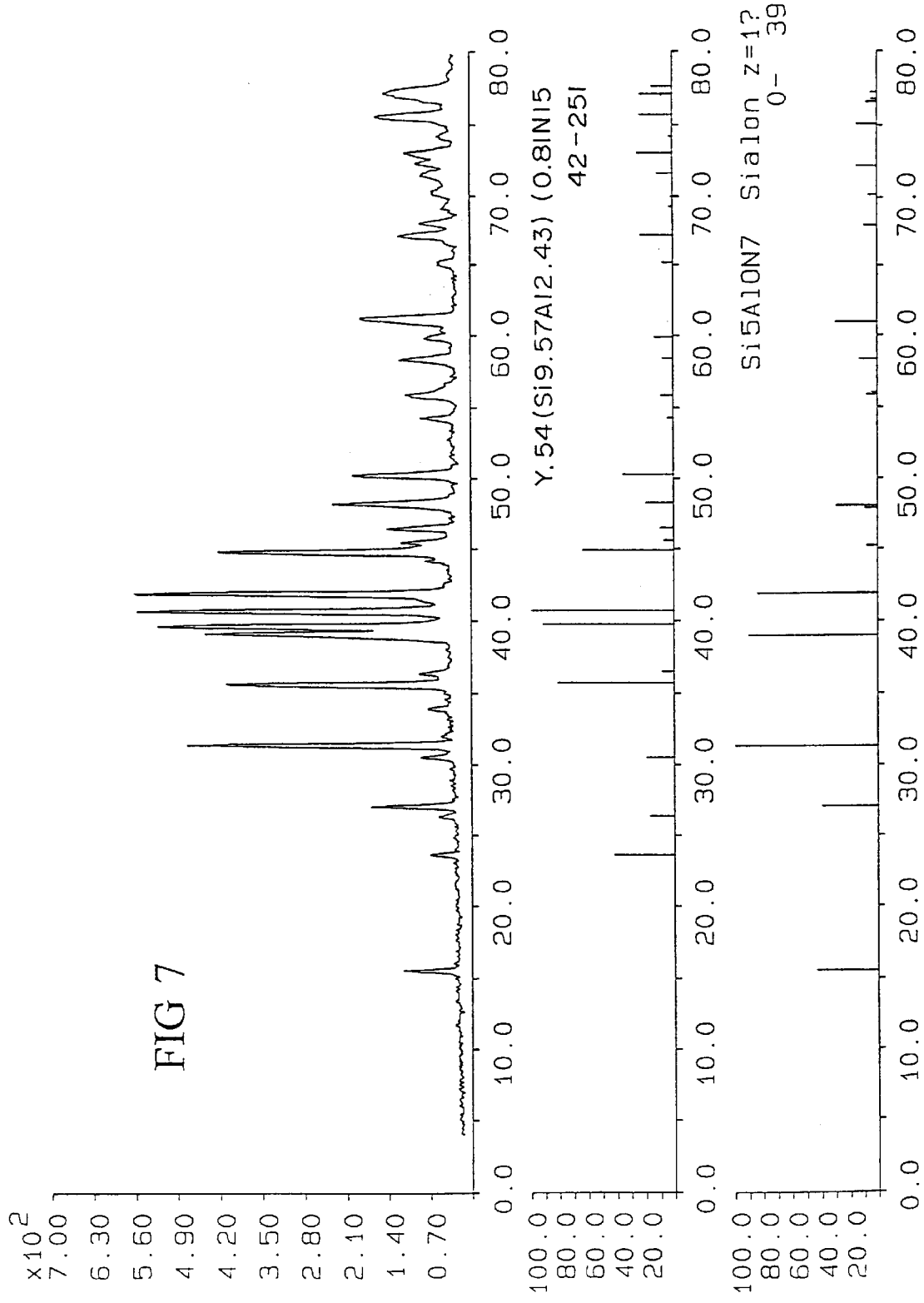
FIG. 7 shows a comparison between the X-ray diffraction pattern for the product formed by the process of Example 16 and standard XRD patterns.

The pellet decreased in mass by 16.6% during the firing, and an analysis of the products by X-ray powder diffraction (XRD), as shown in FIG. 7, revealed Y α'SiAlON with an approximately equal amount of β'SiAlON.

Example 17

The effect of small amounts of additives on the synthesis of α'SiAlON.

The addition of small amounts (2 volume %) of some metal oxides promote the reaction. The addition of 2 volume % of zirconia, yttria, cuprous oxide, and hematite each separately promoted the formation of α'SiAlON from the mixtures described in Examples 12 and 13.

To a subsample taken from the 20 g mixture described in Example 12. a zirconia addition equivalent to 2% by volume was made.
The Mixture
  0.010 g Tosoh TZ-0 Zirconia ZrO$_2$
  0.337 g Mixture A21 (Calcite+Clay+Silicon+Carbon) ex Example 12

The mixture was blended by dry grinding by hand in an agate mortar. The dry powder was uniaxially pressed to 8 MPa in a 13 mm diameter steel die to form pellets approximately 0.3 g. in weight.

The pellet (21A13) was fired with a similar pellet formed from Mixture A21 (2113) (Calcite+Clay+Silicon+Carbon ex Example 12) in a horizontal tube furnace (40 mm diam tube) in a small alumina crucible under a flowing nitrogen atmosphere (approximately 100 ml.min$^{-1}$) at 5° C.min$^{-1}$ to 110° C., held at that temperature for 2 hours, then heated at 5° C.min$^{-1}$ to 600° C., held at that temperature for 1 hour, then heated at 5° C.min$^{-1}$ to 1400° C. and held at that temperature for 8 hours, then cooled at 10° C.min$^{-1}$ until the natural cooling rate of the furnace was slower than 10° C.min$^{-1}$ after which it was allowed to cool to room temperature and the samples recovered.

The pellet 21A13 with the zirconia addition decreased in mass by 24.0% during the firing, and the pellet 2113 with no zirconia addition decreased in mass by 24.8% during the firing. An analysis of the products by X-ray powder diffraction (XRD) revealed Ca α'SiAlON and β'SiAlON present in both samples with approximately twice the Ca α'SiAlON content in the pellet 21A13 with the zirconia addition.

Figure 8:
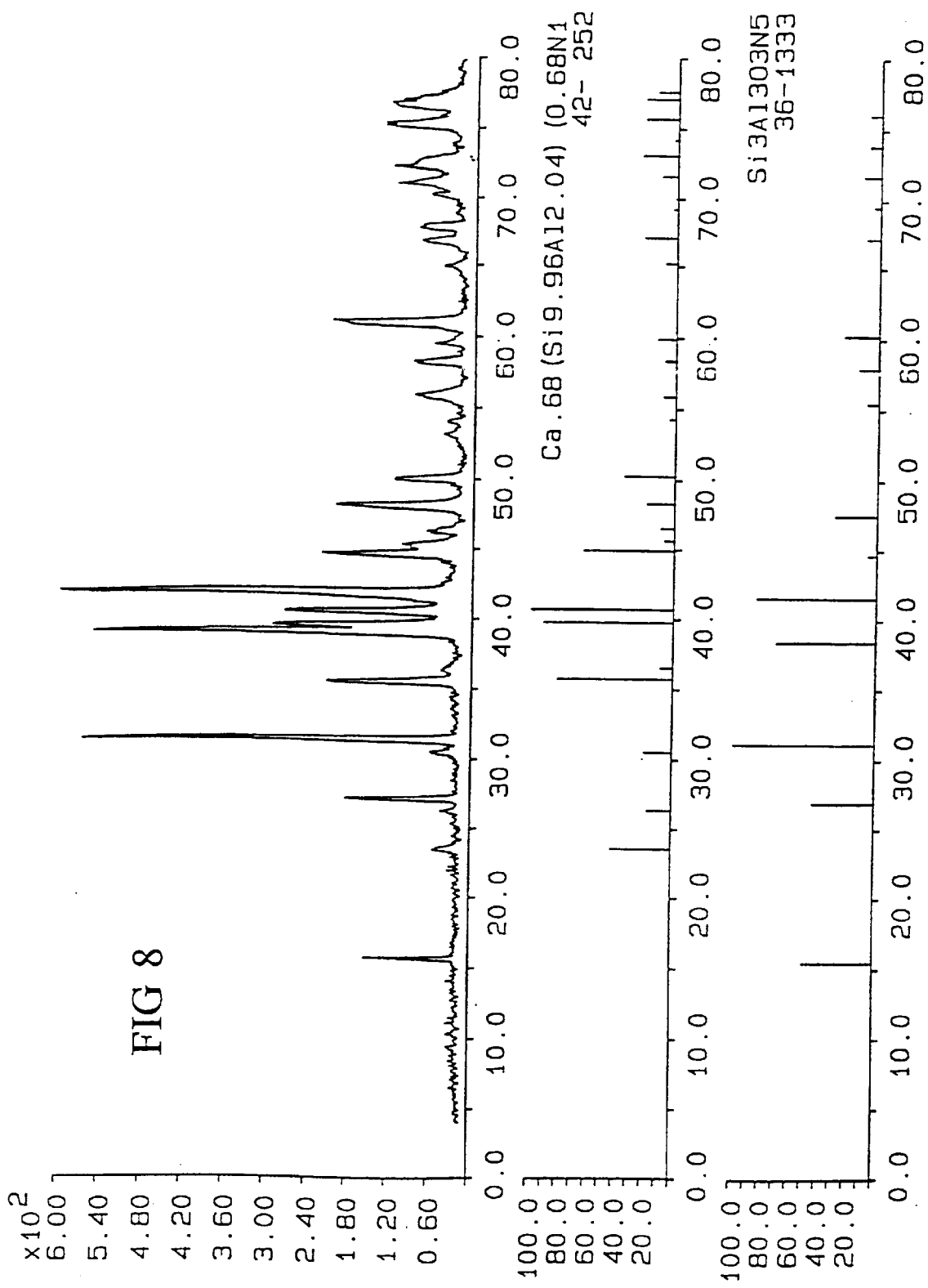
FIG. 8 shows a comparison between the X-ray diffraction pattern for the product formed by the process of Example 17 without zirconia addition and standard XRD patterns.
Figure 9:
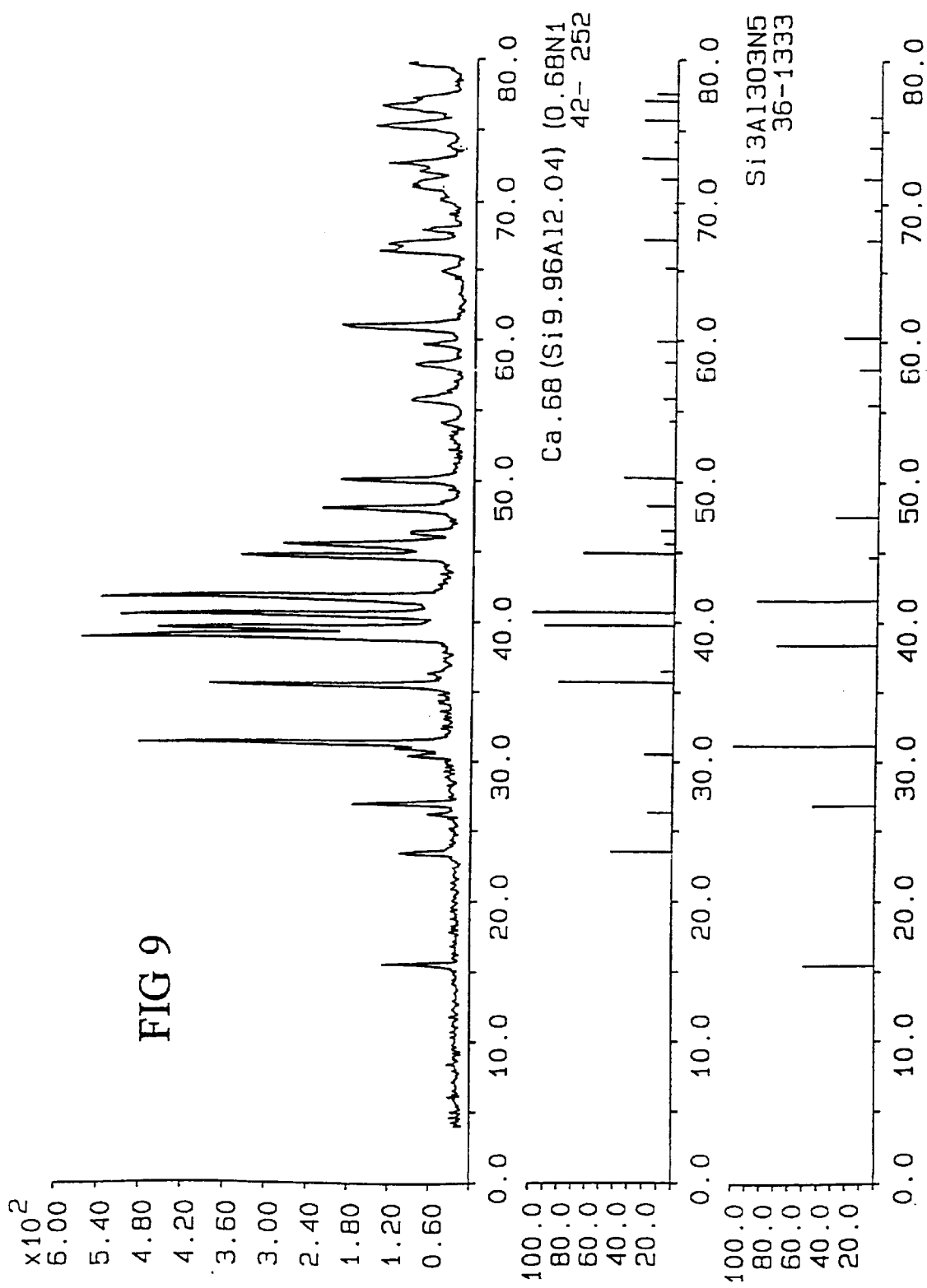
FIG. 9 shows a comparison between the X-ray diffraction pattern for the product formed by Example 17 with zirconia addition and standard XRD patterns.

FIG. 8 shows the XRD pattern—no zirconia addition.
FIG. 9 shows the XRD pattern—with zirconia added.

Example 18

The effect of large additions of ceramic additives on the synthesis of α'SiAlON.

To a subsample taken from the 20 g mixture described in Example 12. an aluminium nitride addition equivalent to 50% by volume was made.

The Mixture
  0.149 g Aluminium Nitride HC Starck
  0.198 g Mixture A21 (Calcite+Clay+Silicon+Carbon) ex Example 12

The mixture was blended by dry grinding by hand in an agate mortar. The dry powder was uniaxially pressed to 8 MPa in a 13 mm diameter steel die to form a pellet approximately 0.3 g. in weight.

The pellet was fired in a horizontal tube furnace (40 mm diam tube) in a small alumina crucible under a flowing nitrogen atmosphere (approximately 100 ml.min$^{-1}$) at 5° C.min$^{-1}$ to 110° C., held at that temperature for 2 hours, then heated at 5° C.min$^{-1}$ to 600° C., held at that temperature for 1 hour, then heated at 5° C.min$^{-1}$ to 800° C. and held at that temperature for 2 hours, then heated at 5° C.min$^{-1}$ to 1100° C., then heated at 1° C.min$^{-1}$ to 1250° C. and held at that temperature for 4 hours, then heated at 1° C.min$^{-1}$ to 1450° C. and held at that temperature for 8 hours, then cooled at 10° C.min$^{-1}$ until the natural cooling rate of the furnace was slower than 10° C.min$^{-1}$ after which it was allowed to cool to room temperature and the sample recovered.

Figure 10:
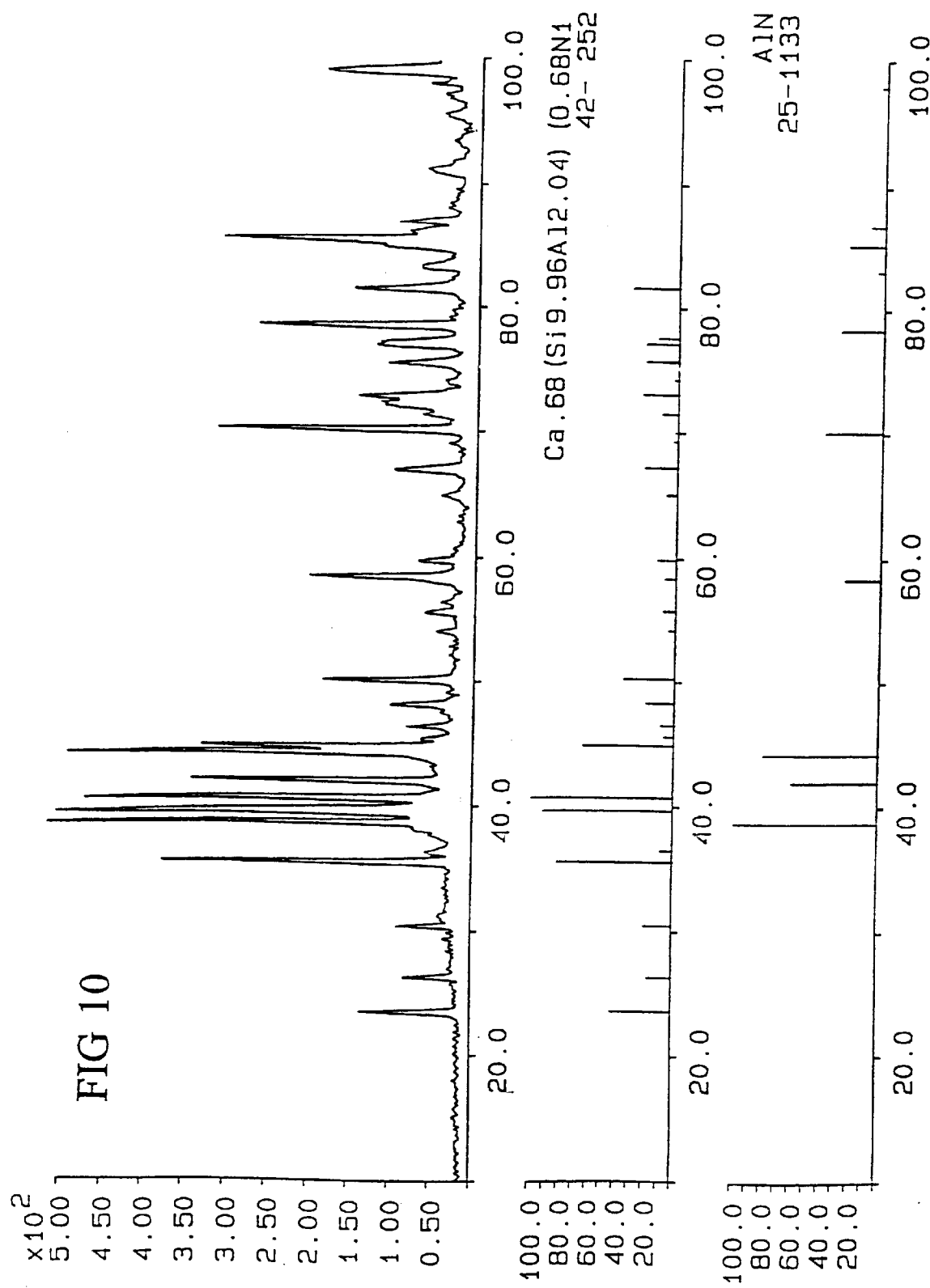
FIG. 10 shows a comparison between the X-ray diffraction pattern for the product formed by the process of Example 18 and standard XRD patterns.

The pellet increased in mass by 3.9% during the firing, and an analysis of the products by X-ray powder diffraction (XRD), as shown in FIG. 10, revealed equal amounts of Ca α'SiAlON and AlN.

Example 19

The effect of large additions of coarse ceramic additives on the synthesis of α'SiAlON. Silicon carbide is the coarse ceramic additive employed here and this demonstrates the potential for the manufacture of a reaction bonded composite product.

To a subsample taken from the 20 g mixture described in Example 12. a silicon carbide addition equivalent to 50% by volume was made.
The Mixture
  0.148 g Navarro 80 mesh C5 Silicon Carbide
  0.199 g Mixture A21 (Calcite+Clay+Silicon+Carbon) ex Example 12

The mixture was blended by dry grinding by hand in an agate mortar. The dry powder was uniaxially pressed to 8 MPa in a 13 mm diameter steel die to form a pellet approximately 0.3 g. in weight.

The pellet was fired in a horizontal tube furnace (40 mm diam tube) in a small alumina crucible under a flowing nitrogen atmosphere (approximately 100 ml.min$^{-1}$) at 5° C.min$^{-1}$ to 110° C., held at that temperature for 2 hours, then heated at 5° C.min$^{-1}$ to 600° C., held at that temperature for 1 hour, then heated at 5° C.min$^{-1}$ to 800° C. and held at that temperature for 2 hours, then heated at 5° C.min$^{-1}$ to 1100° C., then heated at 1° C.min$^{-1}$ to 1250° C. and held at that temperature for 4 hours, then heated at 1° C.min$^{-1}$ to 1450° C. and held at that temperature for 8 hours, then cooled at 10° C.min$^{-1}$ until the natural cooling rate of the furnace was slower than 10° C.min$^{-1}$ after which it was allowed to cool to room temperature and the sample recovered.

Figure 11:
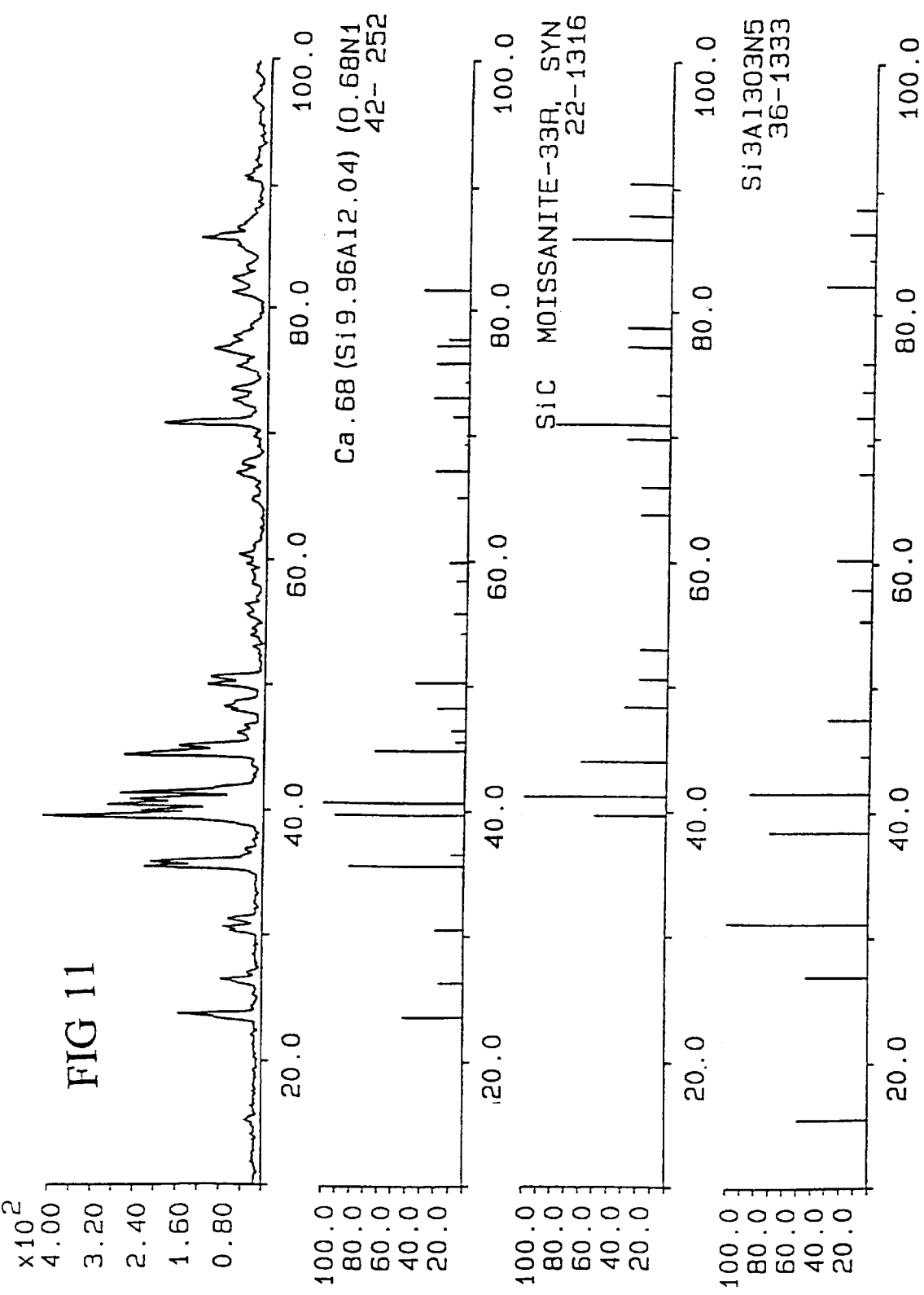
FIG. 11 shows a comparison between the X-ray diffraction pattern for, the product formed by the process of Example 19 and standard XRD patterns.

The pellet decreased in mass by 12.3% during the firing, and an analysis of the products by X-ray powder diffraction (XRD), as shown in FIG. 11, revealed equal amounts of Ca α'SiAlON and silicon carbide with a small amount of β'SiAlON.

Example 20

Synthesis of β'SiAlON composites with β'SiAlON by reacting clay, silicon, and carbon with nitrogen.

A stoichiometric mixture to form β'SiAlON with z=0.5 was weighed out according to the following equation:

β'SiAlON z=0.5, from NZCC halloysite clay, silicon, and carbon
$Al_2O_3 \cdot 2SiO_2 \cdot 2.2H_2O + 19.6Si + 15N_2 + 5.8C \rightarrow$
$4Si_{5.5}Al_{0.5}O_{0.5}N_{7.5} + 5.8CO + 2.2H_2O \uparrow$ Wt % clay=31.53%
Wt % Si=60.79%
Wt % C=7.68% (+10%=8.45%)
Wt Gain=24.06%

Additional carbon (10% of the required amount) was included to cover small quantities of entrained and physically bound air and water.

The Mixture
- 6.31 g New Zealand China Clays Premium Grade Halloysite Clay
- 12.16 g Permascand 4D Silicon
- 1.69 g Degussa Lampblack 101

The 20 g mixture was blended by ball-milling with approximately 400 g of 10 mm diameter $Si_3N_4$ balls and 70 g of hexane in a 1 liter high density polyethylene (HDPE) bottle for 17 hours at approximately 150 rpm. The hexane solvent was removed by rotary evaporation. The dry powder was made plastic with water and extruded through a 3 mm circular orifice to yield a cylindrical rod which was dried at 110° C. and broken into short lengths (or pellets) 10–20 mm long.

Two pellets were fired in a horizontal tube furnace (40 mm diam tube) in a small alumina crucible under a flowing nitrogen atmosphere (approximately 100 ml.min$^{-1}$) at 10° C.min$^{-1}$ to 1350° C., held at that temperature for 4 hours, then heated at 10° C.min$^{-1}$ to 1400° C. and held at that temperature for 8 hours.

Figure 12:
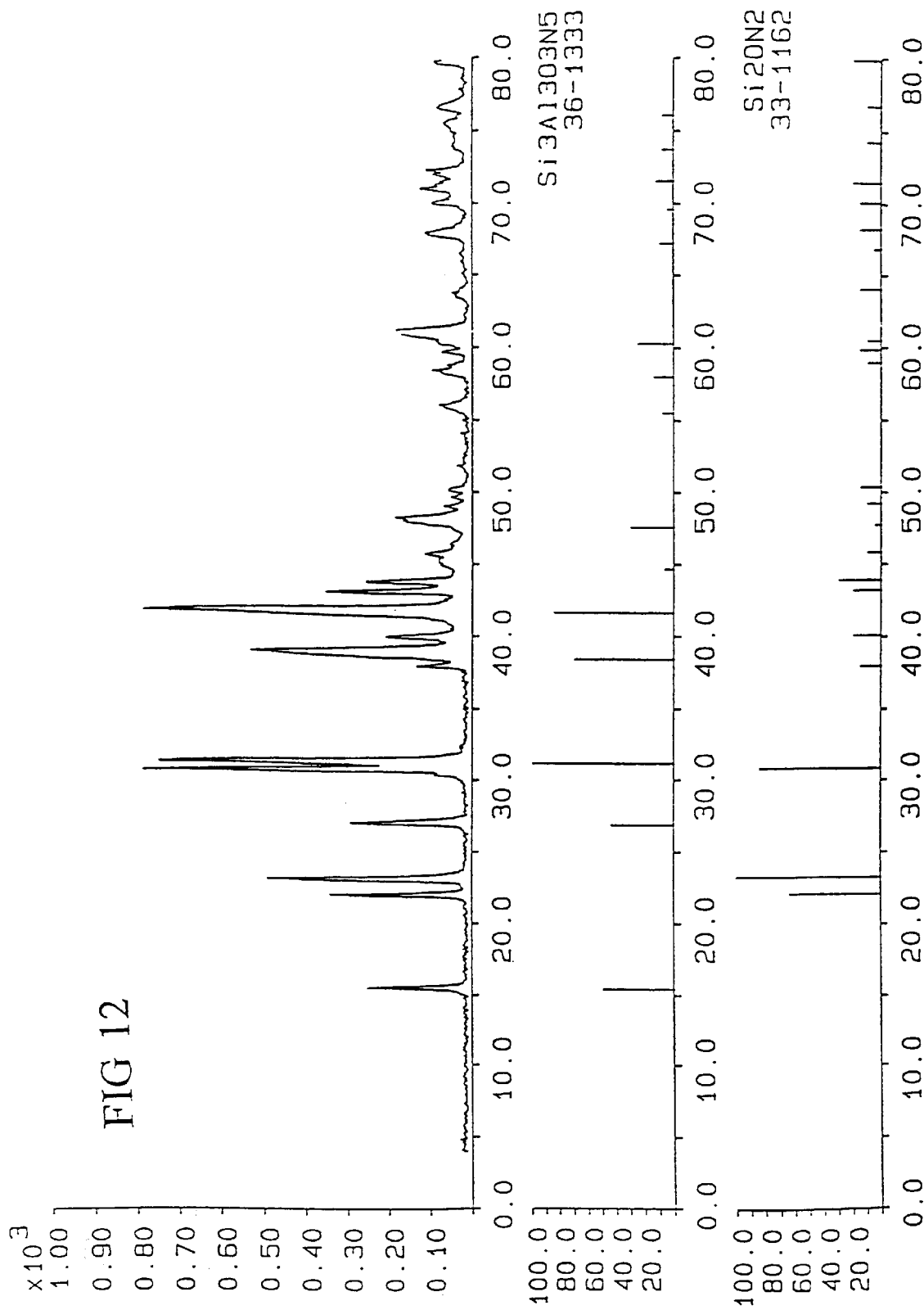
FIG. 12 shows a comparison between the X-ray diffraction pattern for the product formed by the process of Example 20 and standard XRD patterns.

The pellets increased in mass by 22.3% during the firing, and an analysis of the products by X-ray powder diffraction (XRD), as shown in FIG. 12, revealed approximately equal amounts of β'SiAlON and O'-SiAlON and traces of silicon carbide.

Example 21

Synthesis of other SiAlON compounds with β'SiAlON.

Given the parameters of the invention a synthesis employing the following compositions will form composites of β'SiAlON with other SiAlON compounds by this process.

Mixture 1
- Clay 72.84%
- Silicon 11.90%
- Carbon 15.26%

This mixture when reacted by the process described here will form about 87% β'SiAlON and about 13% X phase SiAlON.

Mixture 2
- Clay 55.33%
- Silicon 39.30%
- Carbon 5.17%

This mixture when reacted by the process described here will form about 47% β'SiAlON, about 47% β'SiAlON, and 6% X phase SiAlON.

The foregoing describes preferred forms of the invention and it is to be understood that the scope of the invention is not to be limited to the specific forms described. Modifications and variations as will be obvious to a person skilled in the art may be made to the forms of the invention as described without departing from the spirit or scope of the invention as defined in the attached claims.

What is claimed is:

1. A process for producing a ceramic material comprising α'SiAlON from a starting mixture comprising silicon metal, clay and a source of a metal cation capable of stabilizing the structure of α'SiAlON, wherein the process comprises heating the starting mixture in a flowing nitrogen, or nitrogen containing, atmosphere to a temperature sufficient to react the silicon metal and the nitrogen with the clay to form the α'SiAlON and wherein the clay participates in the reaction as a source of aluminium and silicon.

2. A process for preparing a ceramic material comprising α' or β'SiAlON from a starting mixture comprising silicon metal, clay and silicon carbide, wherein the process comprises heating said mixture in a flowing nitrogen, or nitrogen-containing, atmosphere to a temperature sufficient to react said silicon metal and said nitrogen with said clay to form said α' or β'SiAlON and wherein said clay participates in the reaction as a source of aluminium and silicon.

3. The process of claim 1 or claim 2 wherein the clay is dehydroxylated clay.

4. The process of claim 1 or claim 2 wherein the clay in the starting mixture is present between about 11% and about 80% by weight.

5. The process of claim 1 wherein the starting mixture further includes an additive selected from carbon and silicon carbide.

6. The process of claim 1 wherein the starting mixture contains, by weight, about 11% to about 80% clay, about 9% to about 89% silicon metal and 0% to about 20% carbon.

7. The process of claim 1 or claim 2 wherein said source of a metal cation is a sintering aid selected from the group consisting of yttria, calcia, magnesia and lithia.

8. The process of claim 1 or claim 2 wherein the clay contains a free silica component.

9. The process of claim 1 wherein the silicon metal and said clay are present as fine powders.

10. The process of claim 1 or claim 2 wherein the atmosphere is selected from the group consisting of substantially pure nitrogen, a mixture of hydrogen and nitrogen, and ammonia.

11. The process of claim 1 or claim 2 wherein the atmosphere is a flowing nitrogen atmosphere which comprises about 0.5% oxygen or less and about 0.5% water vapor or less.

12. The process of claim 1 or claim 2 wherein the mixture is heated to between about 1350° C. and about 1900° C.

13. The process of claim 12, wherein said mixture is heated at a rate of from about 1° C. to about 10° C. per minute.

14. The process of claim 13, wherein said mixture is held at a temperature sufficient to react the silicon and the nitrogen with the clay, for a period of up to about 12 hours.

15. The process of claim 1 or claim 2 wherein the clay is a hydrated clay.

16. The process of claim 15 wherein the hydrated clay is a Kaolin clay.

17. The process of claim 1 wherein the starting mixture further includes a ceramic material, said ceramic material being selected from the group consisting of silicon carbide (SiC), alumina ($Al_2O_3$), aluminium nitride (AlN), silicon nitride ($Si_3N_4$), SiAlON, zirconia ($ZrO_2$) and silica ($SiO_2$).

18. The process of claim 17 wherein the ceramic material is coarser than each of the silicon metal, the clay or the source of a metal cation.

19. The process of claim 17 wherein the ceramic material constitutes from about 40% to about 70% by weight of the starting mixture.

20. The process of claim 1 wherein the SiAlON formed is an α'SiAlON having a formula:

$$M_{m/v}Si_{(m+n)}Al_{(m+n)}O_nN_{16-n}$$

where M is a metal cation having a valence v and where m and n indicate the replacement of (m+n) (Si—N) bonds by m(Al—N) and n(Al—O) bonds in the α-Si₃N₄ structure.

21. The process of claim 20 wherein the α'SiAlON is formed from a β'SiAlON having a formula:

$$Si_{6-z}Al_zO_zn_{8-z}$$

where z is in a range of 0.1–3.0.

22. The process of claim 2, wherein said starting mixture includes, by weight, about 11% to about 80% clay and about 9% to about 89% silicon metal.

23. The process of claim 2 wherein the silicon metal, clay and silicon carbide are present as fine powders.

24. The process of claim 2 wherein the mixture is held at a temperature sufficient to react the silicon metal and nitrogen with the clay, for a period of up to about 12 hours.

25. The process of claim 2 wherein the clay is a hydrated clay.

26. The process of claim 25 wherein the hydrated clay is a Kaolin clay.

27. The process of claim 2 wherein the starting mixture further includes a ceramic material, said ceramic material being selected from the group consisting of silicon carbide (SiC), alumina (Al₂O₃), aluminium nitride (AlN), silicon nitride (Si₃N₄), SiAlON, zirconia (ZrO₂) or silica (SiO₂).

28. The process of claim 27 wherein the ceramic material is coarser than each of the silicon metal, the clay and the silicon carbide.

29. The process of claim 27 wherein the ceramic material constitutes from about 40% to about 70% by weight of the starting mixture.

30. The process of claim 2 wherein the SiAlON formed as β'SiAlON has a composition of a general formula of $Si_{6-z}Al_zO_zM_{8-z}$ wherein z is in the range of from 0.1 to 3.0.

31. A process for producing a composite ceramic including β' or α'SiAlON from a mixture of fine powder components comprising a ceramic material and a β' or α'SiAlON precursors, wherein said precursors include silicon metal and clay, and wherein said process comprises heating said mixture in a flowing nitrogen, or nitrogen-containing, atmosphere to a temperature sufficient to react said silicon metal and said nitrogen with said clay to form β' or α'SiAlON, such that a composite ceramic including β' or α'SiAlON is formed, wherein said clay participates in the reaction as a source of aluminium and silicon.

32. A process according to claim 31, wherein said ceramic material comprises from about 40% to about 70% by weight of said mixture, and said precursors comprise, by weight, about 50% to about 70% silicon metal, about 20% to about 40% clay and about 5% to about 10% carbon.

33. A process according to claim 32, wherein said mixture is heated at a rate of from about 1.5° C. to about 10° C. per minute, to a temperature of from about 1350° C. to about 1900° C. in said atmosphere, wherein said atmosphere has about 0.5% oxygen or less and about 0.5% water vapor or less, and the temperature is held at between about 1350° C. to about 1900° C. for a period of up to about eight hours to form said composite ceramic.

34. The process of claim 33, wherein said ceramic material included in the mixture is coarser than each of said precursors.

35. The process of claim 34, wherein said ceramic material is selected from the group consisting of silicon carbide (SiC), alumina (Al₂O₃), aluminium nitride (AlN), silicon nitride (Si₃N₄), SiAlON, zirconia (ZrO₂) and silica (SiO₂).

* * * * *